United States Patent
Hasegawa

(10) Patent No.: US 11,643,490 B2
(45) Date of Patent: May 9, 2023

(54) METHOD FOR PRODUCING VINYL-ETHER-GROUP-CONTAINING (METH)ACRYLIC ACID ESTER POLYMER, VINYL-ETHER-GROUP-CONTAINING (METH)ACRYLIC ACID ESTER POLYMER, AND POLYMER COMPOSITION

(71) Applicant: NIPPON SHOKUBAI CO., LTD., Osaka (JP)

(72) Inventor: Munehiro Hasegawa, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 272 days.

(21) Appl. No.: 16/973,352

(22) PCT Filed: Jun. 7, 2019

(86) PCT No.: PCT/JP2019/022787
§ 371 (c)(1),
(2) Date: Dec. 8, 2020

(87) PCT Pub. No.: WO2019/240049
PCT Pub. Date: Dec. 19, 2019

(65) Prior Publication Data
US 2021/0246245 A1 Aug. 12, 2021

(30) Foreign Application Priority Data
Jun. 11, 2018 (JP) .............. JP2018-111333

(51) Int. Cl.
*C08F 220/40* (2006.01)
*C08F 220/28* (2006.01)
*C08F 220/14* (2006.01)

(52) U.S. Cl.
CPC ........ *C08F 220/40* (2013.01); *C08F 220/282* (2020.02); *C08F 220/286* (2020.02)

(58) Field of Classification Search
CPC .................. C08F 220/40; C08F 220/282; C08F 220/286; C08F 220/14
See application file for complete search history.

(56) References Cited

U.S. PATENT DOCUMENTS

| | | |
|---|---|---|
| 4,943,648 A | 7/1990 | Dicker |
| 2018/0094092 A1 | 4/2018 | Itoh et al. |

FOREIGN PATENT DOCUMENTS

| | | |
|---|---|---|
| JP | H0597869 | 4/1993 |
| JP | H06100628 | 4/1994 |

(Continued)

OTHER PUBLICATIONS

Takada, K. et al., "Controlled Polymerization of Methyl Acrylate for High-Molecular-Weight Polymers by Pentafluorophenylbis(triflyl)methane-Promoted Group Transfer Polymerization Using Triisopropylsilyl Ketene Acetal," Journal of Polymer Science Part A: Polymer Chemistry, 2012, 50, pp. 3560-3566.

(Continued)

*Primary Examiner* — Catherine S Branch
(74) *Attorney, Agent, or Firm* — Hamre, Schumann, Mueller & Larson, P.C.

(57) ABSTRACT

The present invention aims to provide a method capable of easily and efficiently producing a vinyl ether group-containing (meth)acrylic acid ester polymer. The present invention relates to a method of producing a vinyl ether group-containing (meth)acrylic acid ester polymer, the method including group-transfer polymerizing a monomer component containing a vinyl ether group-containing (meth)acrylic acid ester represented by the following formula (1), in the presence of a carbon-carbon double bond-containing silane compound and a catalyst, (Continued)

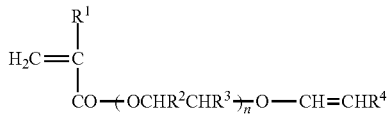

(1)

wherein $R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more.

11 Claims, 7 Drawing Sheets

(56) References Cited

FOREIGN PATENT DOCUMENTS

| JP | 2002-145933 | 5/2002 |
|---|---|---|
| JP | 2002-155114 | 5/2002 |
| JP | 2003-226717 | 8/2003 |
| JP | 2011-235227 | 11/2011 |
| JP | 2018-059073 | 4/2018 |

OTHER PUBLICATIONS

Hu, L. et al., "Silyl Ketene Acetals/B(C6F5)3 Lewis Pair-Catalyzed Living Group Transfer Polymerization of Renewable Cyclic Acrylic Monomers," Molecules, 2018, 23, 665 (19 pages).

Tsitsilianis, et al., "Design of "smart" segmented polymers by incorporating random copolymers as building blocks", European Polymer Journal 47 (2011) 497-510.

Webster, "Living Polymerization Methods", Science, vol. 251(4996), Feb. 22, 1991, 887-893.

Simon, et al., "Kinetic Investigation of Self-condensing Group Transfer Polymerization", Macromolecules, 2004, vol. 37, No. 20, pp. 7548-7558.

Yamanaka, et al., "Systhesis of water-soluble poly[oligo(ethylene gylcol) methacrylate]s by living anionic polymerization of oligo(ethylene glycol) vinyl ether methacrylates", Poly. Chem. 2011, 2, pp. 1837-1848.

Oncul-Koc, et al., "Allyl reactivity in group transfer copolymerization", Macromol. Chem. Phys. 196, 2475-2481, 1995.

METHOD FOR PRODUCING VINYL-ETHER-GROUP-CONTAINING (METH)ACRYLIC ACID ESTER POLYMER, VINYL-ETHER-GROUP-CONTAINING (METH)ACRYLIC ACID ESTER POLYMER, AND POLYMER COMPOSITION

TECHNICAL FIELD

The present invention relates to a method of producing a vinyl ether group-containing (meth)acrylic acid ester polymer, a vinyl ether group-containing (meth)acrylic acid ester polymer, and a polymer composition. The present invention specifically relates to a method of easily and efficiently producing a vinyl ether group-containing (meth)acrylic acid ester polymer, a vinyl ether group-containing (meth)acrylic acid ester polymer, and a polymer composition.

BACKGROUND ART

Known hybrid monomers containing a radical polymerizable group and an ionic polymerizable group in a molecule include vinyl ether group-containing (meth)acrylic acid esters. Polymers of such hybrid polymerizable monomers are industrially highly versatile and useful and are widely used in various applications.

A vinyl ether group-containing (meth)acrylic acid ester contains a vinyl ether group and a (meth)acryloyl group in a monomer. Cationic polymerization of only the vinyl ether groups can provide a polyvinyl ether having a pendant (meth)acryloyl group. On the other hand, polymerization of only the (meth)acryloyl groups can provide an acrylic polymer having a pendant vinyl ether group. To produce a desired polymer from such a vinyl ether group-containing (meth)acrylic acid ester, which has two different polymerizable groups, it needs to be polymerized by a selected optimal polymerization method.

In particular, there are some proposed methods of polymerizing only (meth)acryloyl groups to produce a vinyl ether group-containing (meth)acrylic acid ester polymer.

For example, Patent Literature 1 discloses a method of radical polymerization of a monomer component essentially containing a vinyl ether group-containing (meth)acrylic acid ester using a radical polymerization initiator to produce a radical polymer having a pendant vinyl ether group.

Further, for example, Patent Literature 2 discloses a method of producing the polymer by adding at least a portion of a monomer composition containing a vinyl ether group-containing (meth)acrylic acid ester and/or at least a portion of a radical polymerization initiator composition to a reaction system.

Further, for example, Non-Patent Literature 1 discloses a method of polymerizing (meth)acryloyl groups of vinyl ether group-containing (meth)acrylic acid esters by anionic polymerization.

CITATION LIST

Patent Literature

Patent Literature 1: JP 2002-155114 A
Patent Literature 2: JP 2003-226717 A

Non-Patent Literature

Non-Patent Literature 1: Polym. Chem., 2011, 1837-1848

SUMMARY OF INVENTION

Technical Problem

In radical polymerization of vinyl ether group-containing (meth)acrylic acid esters as raw materials, (meth)acryloyl groups are preferentially polymerized. Yet, a small amount of the vinyl ether groups is also polymerized, which causes crosslinking under a high conversion rate condition and gelation of a polymer obtained.

When vinyl ether group-containing (meth)acrylic acid esters as raw materials are subjected to anionic polymerization disclosed in Non-Patent Literature 1, the water content in the reaction system needs to be strictly controlled because the polymerization initiator or a carbanion as an intermediate is very highly reactive with water. Due to the high reactivity, the presence of impurities easily causes inactivation of a reaction and prevents efficient progress of the reaction. Further, to inhibit the reaction between monomers and esters, the reaction needs to be carried out at a very low temperature of about −70° C. In such a production method including anionic polymerization, the conditions of factors such as water content, impurity content, and temperature need to be considered. When these conditions are controlled, the production process becomes complicated. For the reason, the production method is not suitable for industrial production.

The present invention has been made in view of such a current state of the art and aims to provide a method capable of easily and efficiently producing a vinyl ether group-containing (meth)acrylic acid ester polymer.

Solution to Problem

The present inventors have conducted various studies on a polymerization method of a vinyl ether group-containing (meth)acrylic acid ester containing a vinyl ether group and a (meth)acryloyl group, and found that group-transfer polymerization in the presence of a carbon-carbon double bond-containing silane compound and a catalyst can lead to easy and efficient production of a polymer in which only the (meth)acryloyl groups are polymerized. Thus, the invention has been completed.

That is, the present invention relates to a method of producing a vinyl ether group-containing (meth)acrylic acid ester polymer, the method including:
group-transfer polymerizing a monomer component containing a vinyl ether group-containing (meth)acrylic acid ester represented by the following formula (1), in the presence of a carbon-carbon double bond-containing silane compound and a catalyst,

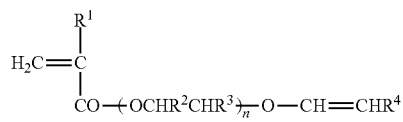
(1)

wherein $R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more.

Preferably, the catalyst is at least one selected from the group consisting of an organic phosphorus compound, a N-heterocyclic carbene, a fluorine ion-containing compound, a cyclic amine compound, and an ammonium salt compound.

Preferably, a solvent has an oxygen concentration of 1000 ppm or lower at the start of the polymerization.

Preferably, the solvent has a water content of 1000 ppm or lower at the start of the polymerization.

The present invention also relates to a vinyl ether group-containing (meth)acrylic acid ester polymer including:
a structural unit represented by the following formula (5); and
a terminal group derived from a carbon-carbon double bond-containing silane compound at a main chain end,

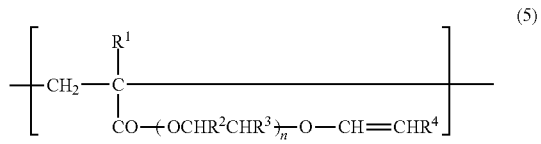

wherein $R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more.

Preferably, the polymer further contains a terminal structure represented by the following formula (9):

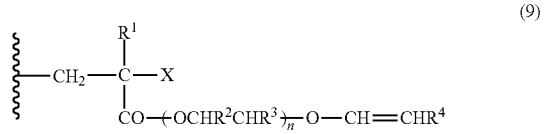

wherein $R^1$ is a hydrogen atom or a methyl group; $R^2$ and $R^3$ are the same as or different from each other and are each a hydrogen atom or an organic group; $R^4$ is a hydrogen atom or an organic group; X is a hydrogen atom, a halogen atom, an alkyl group, a hydroxymethyl group, an allyl group, or a propargyl group; and n is an integer of 1 or more.

Preferably, the polymer has a number average molecular weight of 1000 to 1000000.

The present invention also relates to a vinyl ether group-containing (meth)acrylic acid ester polymer having a weight average molecular weight of 50000 or greater and a molecular weight distribution represented by a ratio of a weight average molecular weight to a number average molecular weight of 2.5 or less.

The present invention also relates to a vinyl ether group-containing (meth)acrylic acid ester polymer,
wherein in a differential molecular weight distribution curve obtained by measuring the polymer by gel permeation chromatography, the polymer satisfies a ratio of a triangle area (A) surrounded by lines T-$L_0$, $L_0$-$L_1$, and $L_1$-T to an area (B) surrounded by the differential molecular weight distribution curve and the line $L_0$-$L_1$ (A/B) of 0.8 to 2.0, wherein T is a point indicating the maximum value of the differential molecular weight distribution curve, and $L_0$ and $L_1$ are each a point at a height of 5% of the height of the point T on the differential molecular weight distribution curve, $L_0$ being on a lower-molecular-weight side of the distribution curve than $L_1$.

Preferably, in the polymer, an amount of a matter insoluble in ethyl acetate, toluene, or tetrahydrofuran relative to 100% by mass of the polymer is 10% by mass or less.

Preferably, the polymer is obtainable by the method of producing a vinyl ether group-containing (meth)acrylic acid ester polymer.

The present invention also relates to an intermediate of a vinyl ether group-containing (meth)acrylic acid ester polymer, including:
a structural unit represented by the following formula (5); and
a first terminal group represented by the following formula (6), (7), or (8) and a second terminal group represented by the following formula (10) at respective main chain ends:

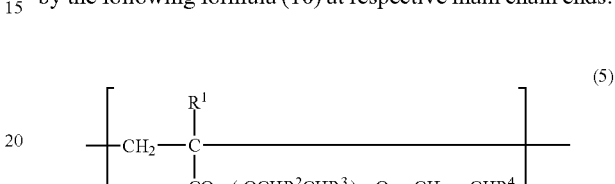

wherein in the formula (5), $R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more;
in the formula (6), $R^5$ and $R^6$ are the same as or different from each other and are each a hydrogen atom or an organic group; and $R^7$ is an organic group;
in the formulas (7) and (8), $R^5$, $R^6$, and $R^{7'}$ are the same as or different from each other and are each a hydrogen atom or an organic group; and
in the formula (10), $R^8$, $R^9$, and $R^{10}$ are the same as or different from each other and are each an organic group; $R^{11}$ is —(O—CHR$^2$CHR$^3$)$_n$—O—CH=CHR$^4$ where $R^2$ and $R^3$ are the same as or different from each other and are each a hydrogen atom or an organic group, $R^4$ is a hydrogen atom or an organic group, and n is an integer of 1 or more; and $R^{12}$ is a hydrogen atom or a methyl group.

The present invention also relates to a polymer composition including the vinyl ether group-containing (meth)acrylic acid ester polymer,
wherein an amount of a residual monomer is 10% by mass or less relative to 100% by mass of the polymer in the polymer composition.

Advantageous Effects of Invention

The method of producing a vinyl ether group-containing (meth)acrylic acid ester polymer of the present invention can easily and efficiently produce a vinyl ether group-containing (meth)acrylic acid ester polymer. The vinyl ether group-containing (meth)acrylic acid ester polymer obtainable by the production method of the present invention is suitable for pressure sensitive adhesives, adhesives, ink compositions for printing, compositions for resist, coating agents, and molding materials, for example.

DESCRIPTION OF EMBODIMENTS

Figure 1:
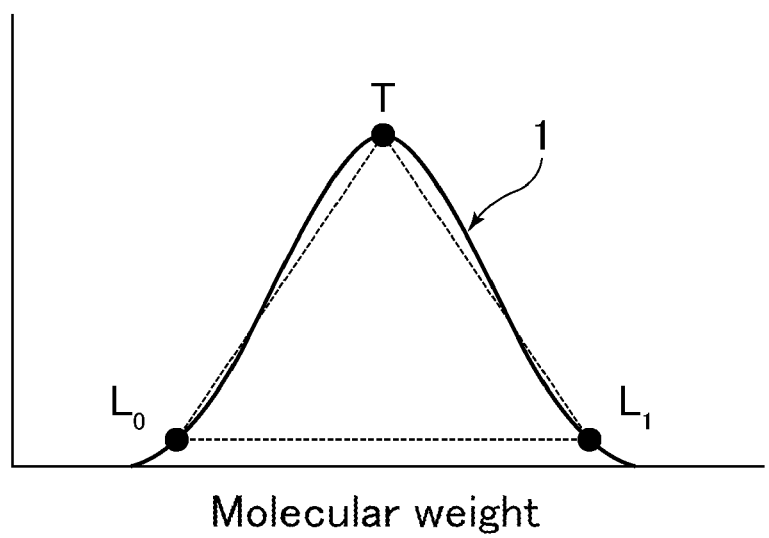
FIG. 1 is a schematic view of a molecular weight distribution curve obtained by GPC.

The present invention is described in detail below.

Any combination of two or more of the following preferred embodiments of the present invention is also a preferred embodiment of the present invention.

Herein, the term "(meth)acrylic acid" refers to "acrylic acid and/or methacrylic acid", and the term "(meth)acryloyl group" refers to an "acryloyl group and/or methacryloyl group".

<1. Method of Producing Vinyl Ether Group-Containing (Meth)Acrylic Acid Ester Polymer>

A method of producing a vinyl ether group-containing (meth)acrylic acid ester polymer of the present invention includes group-transfer polymerizing a monomer component containing a vinyl ether group-containing (meth)acrylic acid ester represented by the following formula (1), in the presence of a carbon-carbon double bond-containing silane compound and a catalyst,

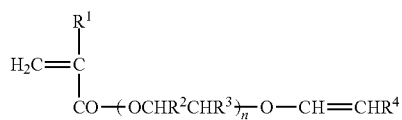

(1)

wherein $R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more.

The group-transfer polymerization used in the production method of the present invention is a kind of anionic polymerization for polymerizing monomers in the presence of a carbon-carbon double bond-containing silane compound as a polymerization initiator. The carbon-carbon double bond-containing silane compound is attached to (meth)acryloyl groups of vinyl ether group-containing (meth)acrylic acid esters to newly yield a polymer, and the silyl ketene acetal at the growing end of the polymer is successively transferred to an end of the polymer. Thus, a polymer can be obtained.

The group-transfer polymerization enables the polymerization reaction of the vinyl ether group-containing (meth)acrylic acid ester within a relatively controllable temperature range such as room temperature. The polymerization reaction can also be carried out without strictly controlling the amount of water in the reaction system. Further, the polymerization enables the production of a vinyl ether group-containing (meth)acrylic acid ester polymer while generation of impurities is reduced and vinyl ether groups are left in a high conversion rate.

As described above, the group-transfer polymerization in the presence of a catalyst enables very easy and efficient production of a vinyl ether group-containing (meth)acrylic acid ester polymer in which only (meth)acryloyl groups of vinyl ether group-containing (meth)acrylic acid esters are polymerized.

In the polymerization in the production method of the present invention, a monomer component containing a vinyl ether group-containing (meth)acrylic acid ester represented by the formula (1) is polymerized using a carbon-carbon double bond-containing silane compound as a polymerization initiator and in the presence of a catalyst.

Specifically, any two of the monomer component, the catalyst, or the carbon-carbon double bond-containing silane compound are put in a reaction vessel, followed by putting the last one component before reaction, and then polymerization is started. These components may be added in any order and any way, and then polymerization may be started. Each of the carbon-carbon double bond-containing silane compound, the catalyst, and the monomer component may be added at once, continuously in small portions, or in several portions.

The molecular weight of the polymer of the monomer component may be appropriately adjusted depending on the type or amount of the monomer component, the type or amount of the carbon-carbon double bond-containing silane compound, the type or amount of the catalyst, or the type or amount of a solvent to be used.

The carbon-carbon double bond-containing silane compound may be used in any amount that can provide a desired polymer. To more efficiently produce the polymer, the amount of the compound is preferably $1 \times 10^{-4}$ to 10 mol %, more preferably $1 \times 10^{-3}$ to 5 mol %, still more preferably $1 \times 10^{-2}$ to 1 mol % relative to the monomer component to be used.

The catalyst may be used in any amount that can provide a desired polymer. To more efficiently produce the polymer, the amount of the catalyst is preferably $1 \times 10^{-4}$ to 10 mol %, more preferably $1 \times 10^{-3}$ to 5 mol %, still more preferably $1 \times 10^{-2}$ to 1 mol % relative to the monomer component to be used.

The polymerization reaction may be performed free from a solvent. Preferably, a solvent is used. The solvent used may be any solvent capable of dissolving the raw materials, catalyst, polymerization initiator, and polymer. To efficiently allow the polymerization reaction to proceed, an aprotic solvent is preferred.

Specific examples of the solvent used in the present invention include aromatic hydrocarbon solvents such as toluene, xylene, and benzene; aliphatic hydrocarbon solvents such as hexane, pentane, heptane, and cyclohexane; ketone solvents such as acetone, methyl ethyl ketone, and methyl isobutyl ketone; halogenated hydrocarbon solvents such as chlorobenzene, dichloromethane, chloroform, and 1,2-dichloroethane; nitrile solvents such as acetonitrile, propionitrile, and valeronitrile; ester solvents such as methyl acetate, ethyl acetate, isopropyl acetate, and butyl acetate; amide solvents such as dimethylformamide (DMF), dimethylacetamide, and N-methylpyrrolidone; ether solvents such as diethyl ether, diisopropyl ether, 1,2-dimethoxyethane (DME), 1,4-dioxane, tetrahydrofuran (THF), tetrahydropyran (THP), anisole, diethylene glycol dimethyl ether (diglyme), diethylene glycol ethyl ether (carbitol), and cyclopentyl methyl ether (CPME); fluorine solvents such as perfluorohexane, perfluorocyclohexane, pentafluorobenzene, and octafluorotoluene; DMSO; and nitromethane.

Among these, to more efficiently allow the polymerization reaction to proceed, the solvent is preferably at least one selected from the group consisting of aromatic hydrocarbon solvents, aliphatic hydrocarbon solvents, ketone solvents, halogenated hydrocarbon solvents, ether solvents, ester solvents, and nitrile solvents. More preferred are aromatic hydrocarbon solvents, ether solvents, and ester solvents.

Each of these solvents may be used alone or two or more of these may be used in combination.

The solvent may be used in an amount of preferably 10 to 10000% by mass, more preferably 50 to 5000% by mass, still more preferably 100 to 1000% by mass relative to 100% by mass of the whole amount of the monomer component used.

In the polymerization, the solvent preferably has an oxygen concentration of 1000 ppm or lower at the start of the polymerization. In the solvent having an oxygen concentration within the above range at the start of the polymerization, the activity of the carbon-carbon double bond-containing silane compound, catalyst, or the like is further less likely to decrease. Thus, the polymerization reaction proceeds better, and a desired polymer can be produced more efficiently. The oxygen concentration is more preferably 800 ppm or lower, still more preferably 0 to 500 ppm.

The oxygen concentration may be determined with a polarographic dissolved oxygen meter.

In the polymerization, the solvent preferably has a water content of 1000 ppm or lower at the start of the polymerization. In the solvent having a water content within the above range at the start of the polymerization, the carbon-carbon double bond-containing silane compound is less likely to be decomposed, and the activity of the catalyst or the like is further less likely to decrease. Thus, the polymerization reaction proceeds better, and a desired polymer can be produced more efficiently. The water content is more preferably 500 ppm or lower, still more preferably 300 ppm or lower.

The water content may be determined by Karl Fischer moisture measurement.

The polymerization may be performed at any reaction temperature. To control the molecular weight and molecular weight distribution or maintain the catalytic activity, the reaction temperature is preferably −20° C. to 100° C., more preferably −10° C. to 50° C., still more preferably 0° C. to 30° C. In a preferred embodiment of the production method of the present invention, the polymerization is performed at room temperature ±20° C. to reduce the production cost.

The reaction may be performed for any period of time. It is preferably 10 minutes to 48 hours, more preferably 30 minutes to 36 hours, still more preferably 1 to 24 hours.

The reaction atmosphere for the polymerization may be an air atmosphere, preferably an inert gas atmosphere such as nitrogen or argon.

In any of the atmospheres of the polymerization, the oxygen concentration is preferably 10000 ppm or lower, more preferably 1000 ppm or lower, still more preferably 100 ppm or lower.

The polymer obtained by the polymerization reaction has a main chain terminated with a silyl ketene acetal structure or enolate anion structure containing a silyl group derived from the polymerization initiator. The silyl ketene acetal or enolate anion at one end of the polymer is converted into a carboxylic acid or ester by introducing water, an alcohol, or an acid to the reaction system. Thereby, the polymerization reaction can be stopped.

Examples of the alcohol include methanol, ethanol, 1-propanol, 2-propanol, 1-butanol, and 2-butanol.

Examples of the acid include inorganic acids such as hydrochloric acid, sulfuric acid, and phosphoric acid and organic acids such as acetic acid and benzoic acid.

Water, an alcohol, and an acid each may be used in any amount. The amount is preferably 1 to 1000 mol, more preferably 1 to 100 mol, still more preferably 1 to 10 mol per mole of the carbon-carbon double bond-containing silane compound to be used.

An electrophile may be added instead of water, an alcohol, or an acid. Addition of an electrophile enables introduction of target functional groups, whereby the polymerization reaction can be stopped. Examples of the electrophile include halogens such as iodine and bromine, a halogenated succinimide compound, an alkyl halide, an allyl halide, a propargyl halide, an aldehyde, and an acid chloride.

The electrophile may be used in any amount. The amount is preferably 0.5 to 1.5 mol, more preferably 0.6 to 1.3 mol, still more preferably 0.8 to 1.2 mol per mole of the silyl ketene acetal to be used.

The following describes a monomer component, a carbon-carbon double bond-containing silane compound, and a catalyst used in the production method of the present invention.

The monomer component in the present invention includes a vinyl ether group-containing (meth)acrylic acid ester represented by the formula (1).

In the formula (1), $R^1$ is a hydrogen atom or a methyl group.

In the formula (1), $R^2$ and $R^3$ are the same as or different from each other and are each a hydrogen atom or an organic group.

Examples of the organic group for $R^2$ and $R^3$ include a C1-C20 acyclic or cyclic monovalent hydrocarbon group and a group prepared by replacing at least one of the atoms constituting each hydrocarbon group with a halogen, oxygen, nitrogen, or sulfur atom.

Examples of the acyclic hydrocarbon group include a linear or branched aliphatic hydrocarbon group.

Examples of the aliphatic hydrocarbon group include a saturated hydrocarbon group such as an alkyl group and an unsaturated hydrocarbon group such as an alkenyl group. Preferred is a saturated hydrocarbon group.

Specific examples of the aliphatic hydrocarbon group include alkyl groups such as methyl, ethyl, n-propyl, isopropyl, n-butyl, tert-butyl, sec-butyl, pentyl, isopentyl, neopentyl, hexyl, 2-methylpentyl, 3-methylpentyl, 2,2-dimethylbutyl, 2,3-dimethylbutyl, heptyl, 2-methylhexyl, 3-methylhexyl, 2,2-dimethylpentyl, 2,3-dimethylpentyl, 2,4-dimethylpentyl, 3-ethylpentyl, 2,2,3-trimethylbutyl, octyl, methylheptyl, dimethylhexyl, 2-ethylhexyl, 3-ethylhexyl, trimethylpentyl, 3-ethyl-2-methylpentyl, 2-ethyl-3-methylpentyl, 2,2,3,3-tetramethylbutyl, nonyl, methyloctyl, 3,7-dimethyloctyl, dimethylheptyl, 3-ethylheptyl, 4-ethylheptyl, trimethylhexyl, 3,3-diethylpentyl, decyl, undecyl, dodecyl, tridecyl, tetradecyl, pentadecyl, hexadecyl, heptadecyl, octadecyl, nonadecyl, and eicosyl groups; and alkenyl groups such as vinyl, n-propenyl, isopropenyl, 1-butenyl, 2-butenyl, 1-pentenyl, 2-pentenyl, 2-methyl-1-butenyl, 2-methyl-2-butenyl, 3-methyl-1-butenyl, 1-hexenyl, 2-hexenyl, 1-heptenyl, 2-heptenyl, 1-octenyl, and 2-octenyl groups.

Examples of the cyclic hydrocarbon group include an alicyclic hydrocarbon group and an aromatic hydrocarbon group.

Examples of the alicyclic hydrocarbon group include cycloalkyl groups such as cyclopropyl, cyclobutyl, cyclopentyl, cyclohexyl, cycloheptyl, cyclooctyl, and cyclododecyl groups.

Examples of the aromatic hydrocarbon group include aromatic hydrocarbon groups such as phenyl, naphthyl, biphenyl, methoxyphenyl, trichlorophenyl, ethylphenyl, tolyl, xylyl, and benzyl groups.

The halogen atom is preferably chlorine, bromine, or fluorine, more preferably fluorine.

In particular, the organic group is preferably a C1-C10 alkyl group, a C3-C10 cycloalkyl group, a C1-C5 alkyl halide group, or a C6-C12 aromatic hydrocarbon group, more preferably a C1-C6 alkyl group, a C1-C5 alkyl halide group, or a C6-C11 aromatic hydrocarbon group, still more preferably a C1-C2 alkyl group, a C1-C2 alkyl halide group, or a C6-C8 aromatic hydrocarbon group.

In the formula (1), $R^4$ is a hydrogen atom or an organic group.

Examples of the organic group for $R^4$ include the organic groups for $R^2$ and $R^3$. In particular, the organic group for $R^4$ is preferably a C1-C11 acyclic or cyclic hydrocarbon group, more preferably a C1-C10 alkyl group, a C3-C10 cycloalkyl group, or a C6-C11 aromatic hydrocarbon group, still more preferably a C1-C3 alkyl group.

Specific preferred examples of the vinyl ether group-containing (meth)acrylic acid ester represented by the formula (1) include 2-(vinyloxyethoxy)ethyl (meth)acrylate and 2-vinyloxyethyl (meth)acrylate.

Each of the vinyl ether group-containing (meth)acrylic acid esters may be used alone or two or more of these may be used in combination.

The monomer component may further contain a different polymerizable monomer other than the vinyl ether group-containing (meth)acrylic acid ester.

Examples of the different polymerizable monomer include electron-deficient double bond-containing polymerizable monomers. These may be appropriately selected according to the purpose and use of the polymer to be produced.

Examples of the electron-deficient double bond-containing polymerizable monomers include (meth)acrylic acid esters such as methyl (meth)acrylate, ethyl (meth)acrylate, butyl (meth)acrylate, tert-butyl (meth)acrylate, isobutyl (meth)acrylate, 2-ethylhexyl (meth)acrylate, cyclohexyl (meth)acrylate, adamantyl (meth)acrylate, phenyl (meth)acrylate, benzyl (meth)acrylate, dicyclopentanyl (meth)acrylate, isobornyl (meth)acrylate, 2-(acetoacetoxy)ethyl (meth)acrylate, allyl (meth)acrylate, and stearyl acrylate; hydroxy group-containing (meth)acrylic acid esters such as 2-hydroxyethyl (meth)acrylate, 2-hydroxypropyl (meth)acrylate, 3-hydroxypropyl (meth)acrylate, 4-hydroxybutyl (meth)acrylate, caprolactone modified hydroxy (meth)acrylate, and 4-hydroxymethylcyclohexylmethyl (meth)acrylate; cyclic ether group-containing (meth)acrylic acid esters such as glycidyl (meth)acrylate, (3,4-epoxycyclohexyl)methyl (meth)acrylate, tetrahydrofurfuryl (meth)acrylate, and (3-ethyloxetan-3-yl)methyl (meth)acrylate; halogen-containing (meth)acrylic acid esters such as trifluoroethyl (meth)acrylate, octafluoropentyl (meth)acrylate, heptadecafluorodecyl (meth)acrylate, and perfluorooctylethyl (meth)acrylate; nitrogen-containing polymerizable monomers such as (meth)acrylamide, N,N-dimethyl (meth)acrylamide, N,N-dimethylaminopropyl (meth)acrylamide, N-isopropyl (meth)acrylamide, N-methylol (meth)acrylamide, N,N'-dimethylaminoethyl (meth)acrylate, N-phenylmaleimide, N-cyclohexylmaleimide, and 2-isopropenyl-2-oxazoline; polyfunctional polymerizable monomers such as ethylene glycol di(meth)acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth)acrylate, polypropylene glycol di(meth)acrylate, and pentaerythritol tri(meth)acrylate; isocyanate group-containing polymerizable monomers such as 2-(meth)acryloyloxyethyl isocyanate and (meth)acryloyl isocyanate; UV-stable polymerizable monomers such as 4-(meth)acryloyloxy-2,2,6,6-tetramethylpiperidine and 1-(meth)acryloyl-4-cyano-4-(meth)acryloylamino-2,2,6,6-tetramethylpiperidine; polymerizable cyclic lactone monomers such as methylene butyrolactone and methyl methylene butyrolactone; (meth)acrylonitrile; and maleic anhydride.

The number of carbon atoms of the different polymerizable monomer is preferably 1 to 22, more preferably 1 to 18, still more preferably 3 to 15.

Each of these different polymerizable monomers may be used alone or two or more of these may be used in combination.

When the monomer component contains the vinyl ether group-containing (meth)acrylic acid ester and any of the different polymerizable monomers, the amount of each monomer may be appropriately designed according to the purpose and use of the polymer to be produced.

The carbon-carbon double bond-containing silane compound used in the present invention is, for example, preferably one or two or more selected from the group consisting of a silyl ketene acetal represented by the following formula (2):

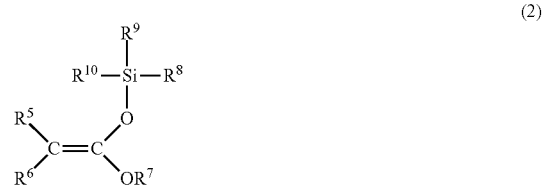

wherein $R^5$ and $R^6$ are the same as or different from each other and are each a hydrogen atom or an organic group; $R^7$, $R^8$, $R^9$, and $R^{10}$ are the same as or different from each other and are each an organic group; $R^5$ and $R^6$ or $R^6$ and $R^7$ may be bonded to each other to form a ring structure; and two or more of $R^8$, $R^9$, and $R^{10}$ may be bonded to each other to form a ring structure, a vinyl silane compound represented by the following formula (3):

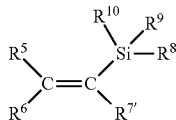

(3)

wherein $R^5$, $R^6$, and $R^{7'}$ are the same as or different from each other and are each a hydrogen atom or an organic group; $R^8$, $R^9$, and $R^{10}$ are the same as or different from each other and are each an organic group; $R^5$ and $R^6$ may be bonded to each other or $R^6$ and $R^{7'}$ may be bonded to each other to form a ring structure; two or more of $R^8$, $R^9$, and $R^{10}$ may be bonded to each other to form a ring structure, and an allyl silane compound represented by the following formula (4):

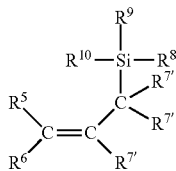

(4)

wherein $R^5$, $R^6$, and $R^{7'}$ are the same as or different from each other and are each a hydrogen atom or an organic group; $R^8$, $R^9$, and $R^{10}$ are the same as or different from each other and are each an organic group; $R^5$ and $R^6$ may be bonded to each other or $R^6$ and $R^{7'}$ may be bonded to each other to form a ring structure; two or more of $R^8$, $R^9$, and $R^{10}$ may be bonded to each other to form a ring structure.

More preferred among these is a silyl ketene acetal because it is highly reactive and makes the polymerization reaction proceed efficiently.

In the formulas (2), (3), and (4), preferably, $R^5$ and $R^6$ are the same as or different from each other and are each a hydrogen atom or a C1-C12 hydrocarbon group.

Examples of the hydrocarbon group include alkyl, alkenyl, cycloalkyl, cycloalkenyl, aromatic hydrocarbon groups. In the hydrocarbon group, at least one of atoms constituting the hydrocarbon group may be replaced with an oxygen, nitrogen, or sulfur atom, or one or more hydrogen atoms constituting the hydrocarbon group may be replaced with a substituent such as a fluorine, chlorine, bromine atom, or another halogen atom; a hydroxy group; or an alkoxy group.

In particular, the hydrocarbon group for $R^5$ and $R^6$ is more preferably a C1-C6 alkyl, cycloalkyl, haloalkyl, or aromatic hydrocarbon group, still more preferably a C1-C6 alkyl or cycloalkyl group, further more preferably a C1-C6 alkyl group, particularly preferably a methyl or ethyl group.

The organic group for $R^7$ and $R^{7'}$ is preferably a C1-C22 hydrocarbon group, more preferably a C1-C12 alkyl, cycloalkyl, or aromatic hydrocarbon group, still more preferably a methyl, ethyl, propyl, butyl, tert-butyl, adamantyl, cyclohexyl, 2-ethylhexyl, or phenyl group, particularly preferably a methyl, ethyl, or tert-butyl group.

$R^5$ and $R^6$ may be bonded to each other or $R^6$ and $R^7$ or $R^{7'}$ may be bonded to each other to form a ring structure.

Examples of the ring structure include an alicyclic hydrocarbon structure such as cyclohexyl, cyclopentyl, or another cycloalkyl and an oxygen-containing heterocyclic ring structure such as a dihydrofuran, tetrahydrofuran, dihydropyran, or tetrahydropyran ring.

$R^8$, $R^9$, and $R^{10}$ are preferably the same as or different from each other and are each a C1-C12 hydrocarbon, alkoxy, or trimethylsilyl group, more preferably a C1-C6 hydrocarbon or alkoxy group, still more preferably a methyl, ethyl, isopropyl, tert-butyl, phenyl, methoxy, ethoxy, or trimethylsilyl group.

In the hydrocarbon group for $R^7$, $R^{7'}$, $R^8$, $R^9$, or $R^{10}$, at least one of atoms constituting the hydrocarbon group may be replaced with an oxygen, nitrogen, or sulfur atom, or one or more hydrogen atoms constituting the hydrocarbon group may be replaced with a substituent such as a fluorine, chlorine, bromine atom, or another halogen atom; a hydroxy group; or an alkoxy group. Two or more of the hydrocarbon groups for $R^8$, $R^9$, and $R^{10}$ may be bonded to each other to form a ring structure.

Specific examples of the group represented by —$SiR^8R^9R^{10}$ in the formulas (2), (3), or (4) include trimethylsilyl, triethylsilyl, triisopropylsilyl, triisobutylsilyl, tert-butyldimethylsilyl, triphenylsilyl, methyldiphenylsilyl, dimethylphenylsilyl, trimethoxysilyl, and triethoxysilyl groups. Preferred among these are trimethylsilyl, triethylsilyl, triisopropylsilyl, tert-butyldimethylsilyl, triethoxysilyl, and triphenylsilyl groups because they are easily available and can be easily synthesized.

Specific examples of the silyl ketene acetal represented by the formula (2) include methyl (trimethylsilyl)dimethylketene acetal, methyl (triethylsilyl)dimethylketene acetal, methyl (triisopropylsilyl)dimethylketene acetal, methyl (tert-butyldimethylsilyl)dimethylketene acetal, methyl (trimethylsilyl)diethylketene acetal, methyl (triphenylsilyl) dimethylketene acetal, methyl (methyldiphenylsilyl)dimethylketene acetal, methyl (dimethylphenylsilyl)dimethylketene acetal, methyl (triethoxysilyl)dimethylketene acetal, ethyl (trimethylsilyl)dimethylketene acetal, 2-ethylhexyl (trimethylsilyl)dimethylketene acetal, tert-butyl (trimethylsilyl)dimethylketene acetal, and 1-[(1-methoxy-2-methyl-1-propenyl)oxy]-1-methylsilacyclobutane.

Preferred among these are methyl (trimethylsilyl)dimethylketene acetal, methyl (triisopropylsilyl)dimethylketene acetal, and ethyl (trimethylsilyl)dimethylketene acetal because they are easily available, can be easily synthesized, and are stable.

Each of these silyl ketene acetals may be used alone or two or more of these may be used in combination.

Specific examples of the vinyl silane compound represented by the formula (3) include vinyltrimethylsilane, 1-trimethylsilylhexene, 1-trimethylsilyloctene, 1-trimethylsilyl-1-phenylethylene, 1-trimethylsilyl-2-phenylethylene, vinyl-tert-butyldimethylsilane, 1-tert-butyldimethylsilylhexene, 1-tert-butyldimethylsilyloctene, 1-tert-butyldimethylsilyl-2-phenylethylene, vinyltris(trimethylsilyl)silane, 1-tris(trimethylsilyl)silylhexene, 1-tris(trimethylsilyl)syliloctene, and 1-tris(trimethylsilyl)silyl-2-phenylethylene.

Specific examples of the allyl silane compound represented by the formula (4) include 3-(trimethylsilyl)-1-propene, 3-(triethylsilyl)-1-propene, 3-(dimethylethylsilyl)-1-propene, 3-(triisopropylsilyl)-1-propene, 3-(dimethyl isopropylsilyl)-1-propene, 3-(trinormal propylsilyl)-1-propene, 3-(dimethyl normal propylsilyl)-1-propene, 3-(trinormal butylsilyl)-1-propene, 3-(dimethyl normal butylsilyl)-1-propene, 3-(triphenylsilyl)-1-propene, 3-(dimethylphenylsilyl)-1-propene, 2-methyl-3-(trimethylsilyl)-1-propene, 3-(trimethylsilyl)-2-methyl-1-propene, and 3-(triphenylsilyl)-2-methyl-1-propene.

The catalyst used in the present invention is preferably one acting as a basic catalyst such as a Bronsted base or a Lewis base. Examples thereof include inorganic bases such as an alkali metal hydroxide and an alkaline-earth metal hydroxide and organic bases such as a trialkylamine and pyridine.

In particular, to achieve more efficient polymerization of the vinyl ether group-containing (meth)acrylic acid ester, the catalyst is preferably at least one selected from the group consisting of an organic phosphorus compound, N-heterocyclic carbene, a fluorine ion-containing compound, a cyclic amine compound, and an ammonium salt compound. When any of these specific catalysts is used, cationic polymerization of the vinyl ether groups and decomposition of the vinyl ether are less likely to occur in the vinyl ether group-containing (meth)acrylic acid ester, which can achieve more efficient polymerization of only the (meth)acryloyl groups.

Examples of the organic phosphorus compound include phosphazene bases such as 1-tert-butyl-4,4,4-tris(dimethylamino)-2,2-bis[tris(dimethylamino)phosphoranylideneamino]-2$\lambda^5$, 4$\lambda^5$-catena-di(phosphazene) (phosphazene base P4-t-BuP$_4$), 1-tert-octyl-4,4,4-tris(dimethylamino)-2,2-bis[tris(dimethylamino)phosphoranylideneamino]-2$\lambda^5$, 4$\lambda^5$-catena-di(phosphazene) (phosphazene base P4-tOct), 1-tert-butyl-2,2,4,4,4-pentakis(dimethylamino)-2$\lambda^5$,4$\lambda^5$-catena-di(phosphazene) (phosphazene base P2-t-Bu), 1-ethyl-2,2,4,4,4-pentakis(dimethylamino)-2$\lambda^5$,4$\lambda^5$-catena-di(phosphazene) (phosphazene base P2-t-Et), tert-butylimino-tris(dimethylamino)phosphorane (phosphazene base P1-t-Bu), tert-butylimino-tri(pyrrolidino)phosphorane (BTPP), 2-tert-butylimino-2-diethylamino-1,3-dimethylperhydro-1,3,2-diazaphosphorin; and tris(2,4,6-trimethoxyphenyl)phosphine, tributylphosphine, tris(dimethylamino phosphine), 2,8,9-triisobutyl-2,5,8,9-tetraaza-1-phosphabicyclo[3,3,3] undecane, 2,8,9-trimethyl-2,5,8,9-tetraaza-1-phosphabicyclo[3,3,3]undecane, and 2,8,9-triisopropyl-2,5,8,9-tetraaza-1-phosphabicyclo[3,3,3]undecane. Preferred among these are phosphazene base P4-t-BuP$_4$ and 2,8,9-triisobutyl-2,5,8,9-tetraaza-1-phosphabicyclo[3,3,3]undecane because they are strongly basic and can achieve effective activation of the silyl ketene acetal.

Examples of the N-heterocyclic carbene include 1,3-dimethylimidazol-2-ylidene, 1,3-diethylimidazol-2-ylidene, 1,3-di-tert-butylimidazol-2-ylidene, 1,3-dicyclohexylimidazol-2-ylidene, 1,3-di-isopropylimidazol-2-ylidene, 1,3-di(1-adamantyl)imidazol-2-ylidene, and 1,3-di-mesitylimidazol-2-ylidene. Preferred among these are 1,3-di-tert-butylimidazol-2-ylidene and 1,3-di-isopropylimidazol-2-ylidene because they can achieve effective activation of the silyl ketene acetal.

Examples of the fluorine ion-containing compound include tetra-n-butylammonium fluoride (TBAF), tris(dimethylamino)sulfonium bifluoride (TASHF$_2$), hydrogen fluoride-pyridine, tetrabutylammonium bifluoride, and hydrogen potassium fluoride. Preferred among these are tetra-n-butylammonium fluoride (TBAF), tetrabutylammonium bifluoride, and tris(dimethylamino)sulfonium bifluoride (TASHF$_2$) because they are easily available and can achieve effective activation of the silyl ketene acetal.

Examples of the cyclic amine compound include 1,8-diazabicyclo[5.4.0]undec-7-ene, 1,5-diazabicyclo[4.3.0] non-5-ene, and 7-methyl-1,5,7-triazabicyclo[4.4.0]dec-5-ene.

Examples of the ammonium salt compound include tetrabutylammonium bisacetate, tetrabutylammonium acetate, tetrabutylammonium benzoate, tetrabutylammonium bisbenzoate, tetrabutylammonium meta-chlorobenzoate, tetrabutylammonium cyanate, tetrabutylammonium methoxide, tetrabutylammonium thiolate, and tetrabutylammonium bibromide, and salt compounds prepared by replacing the ammonium cation of each ammonium salt compound with a tetramethylammonium, triethylammonium, benzyltributylammonium, N-methyl-N-butylpiperidinium, N-methyl-N-butylpyrrolidinium, or pyridinium cation.

In addition to the above catalysts, the catalyst may be a strongly basic nitrogen-containing heterocyclic compound such as 1,8-diazabicyclo[5.4.0]undec-7-ene, 1,5-diazabicyclo[4.3.0]non-5-ene, or 7-methyl-1,5,7-triazabicyclo[4.4.0] dec-5-ene.

Each of these catalysts may be used alone or two or more of these may be used in combination.

In the polymerization, a different component may further be used in addition to the above-described components as long as it does not affect the effects of the present invention. Examples of the different component include known additives such as a polymerization initiator, a chain transfer agent, a polymerization accelerator, and a polymerization inhibitor which are commonly used for polymerization reaction. These may be appropriately selected as needed.

The production method of the present invention may further include a different step other than the polymerization reaction. Examples of the different step include aging, neutralization, deactivation of a polymerization initiator or a chain transfer agent, diluting, drying, concentration, and purification. These steps may be performed by known methods.

<2. Polymer>

The following describes a preferred example of the vinyl ether group-containing (meth)acrylic acid ester polymer obtainable by the production method of the present invention. The production method of the present invention can easily and efficiently provide a vinyl ether group-containing (meth)acrylic acid ester polymer containing a structural unit represented by the following formula (5) and a terminal group derived from a carbon-carbon double bond-containing silane compound at a main chain end. One aspect of the present invention relates to such a vinyl ether group-containing (meth)acrylic acid ester polymer.

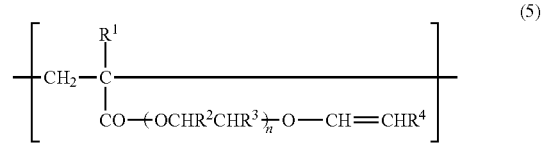

(5)

In the formula, $R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more.

Herein, the vinyl ether group-containing (meth)acrylic acid ester polymer is also referred to as a "first polymer of the present invention". The first polymer, the below-described "second polymer of the present invention", and "third polymer of the present invention" are collectively referred to as "vinyl ether group-containing (meth)acrylic acid ester polymers of the present invention" or "polymers of the present invention".

Each vinyl ether group-containing (meth)acrylic acid ester polymer of the present invention has a structural unit represented by the formula (5). The structural unit represented by the formula (5) is a repeating monomer unit derived from the vinyl ether group-containing (meth)acrylic acid ester represented by the formula (1).

$R^1$, $R^2$, $R^3$, and $R^4$ in the formula (5) are the same as $R^1$, $R^2$, $R^3$, and $R^4$ in the formula (1).

The polymer may further contain a different structural unit other than the structural unit represented by the formula (5). Examples of the different structural unit include a monomer unit derived from any of the different polymerizable monomers described for the production method.

The proportions of the structural unit represented by the formula (5) and the different structural unit may be appropriately designed according to the purpose and use of the polymer.

The polymer preferably contains a terminal group derived from any of the carbon-carbon double bond-containing silane compounds at the initiating end of the main chain. As described above, the production method of the present invention uses any of the carbon-carbon double bond-containing silane compounds as a polymerization initiator, and thus provides a polymer containing a structure derived from the initiator at one end.

Examples of the terminal group derived from any of the carbon-carbon double bond-containing silane compounds include a terminal group derived from any of the silyl ketene acetals, a terminal group derived from any of the vinyl silane compounds, and a terminal group derived from any of the allyl silane compounds.

Specific examples of the terminal group derived from any of the silyl ketene acetals include a structure represented by the following formula (6):

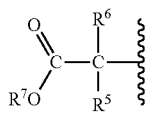

(6)

wherein $R^5$ and $R^6$ are the same as or different from each other and are each a hydrogen atom or an organic group; and $R^7$ is an organic group.

$R^5$, $R^6$, and $R^7$ in the formula (6) are the same as $R^5$, $R^6$, and $R^7$ in the formula (2).

Specific examples of the terminal group derived from any of the vinyl silane compounds include a structure represented by the following formula (7):

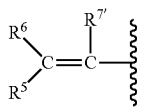

(7)

wherein $R^5$, $R^6$, and $R^{7'}$ are the same as or different from each other and are each a hydrogen atom or an organic group.

$R^5$, $R^6$, and $R^{7'}$ in the formula (7) are the same as $R^5$, $R^6$, and $R^{7'}$ in the formula (3).

Specific examples of the terminal group derived from any of the allyl silane compounds include a structure represented by the following formula (8):

(8)

wherein $R^5$, $R^6$, and $R^{7'}$ are the same as or different from each other and are each a hydrogen atom or an organic group.

$R^5$, $R^6$, and $R^{7'}$ in the formula (8) are the same as $R^5$, $R^6$, and $R^{7'}$ in the formula (4).

The polymer preferably further contains a terminal structure represented by the formula (9). The polymer terminated with a terminal structure represented by the formula (9) can be provided with a desired function. The terminal group derived from any of the carbon-carbon double bond-containing silane compounds corresponds to the polymerization initiating end of the polymer, and the terminal structure represented by the formula (9) corresponds to the polymerization terminating end of the polymer.

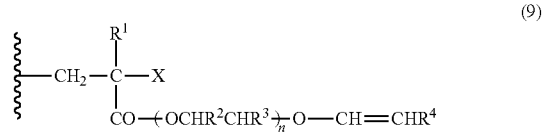

(9)

In the formula, $R^1$ is a hydrogen atom or a methyl group; $R^2$ and $R^3$ are the same as or different from each other and are each a hydrogen atom or an organic group; $R^4$ is a hydrogen atom or an organic group; X is a hydrogen atom, a halogen atom, an alkyl group, a hydroxymethyl group, an allyl group, or a propargyl group; and n is an integer of 1 or more.

$R^1$, $R^2$, $R^3$, and $R^4$ in the formula (9) are the same as $R^1$, $R^2$, $R^3$, and $R^4$ in the formula (1).

X is a hydrogen atom, a halogen atom, an alkyl group, a hydroxymethyl group, an allyl group, or a propargyl group. The alkyl group is preferably a C1-C8 alkyl group, more preferably a C1-C6 alkyl group.

In particular, to make the terminal groups of the polymer the same, X is preferably a hydrogen atom; to easily impart functions to the polymer, X is preferably a propargyl group; and to increase the stability of the polymer, X is preferably an alkyl group.

The polymer preferably has a number average molecular weight of 1000 to 1000000. The polymer having a number average molecular weight within the above range is suitable for various applications such as pressure sensitive adhesives, adhesives, ink compositions for printing, compositions for resist, coatings, and molding materials. The number average molecular weight of the polymer is more preferably 1000 to 500000, still more preferably 5000 to 200000.

Herein, the number average molecular weight can be determined by gel permeation chromatography (GPC) according to the method described in the example below.

The polymer preferably has a weight average molecular weight of 1000 to 1000000. The polymer having a number average molecular weight within the above range is suitable for various applications such as pressure sensitive adhesives, adhesives, ink compositions for printing, compositions for resist, coatings, and molding materials. The weight average molecular weight of the polymer is more preferably 1000 to 500000, still more preferably 5000 to 200000, particularly preferably 10000 to 200000. Herein, the weight average molecular weight can be determined by gel permeation chromatography (GPC) according to the method described in the example below.

The polymer preferably has a molecular weight distribution (weight average molecular weight/number average molecular weight) of 5.0 or less. When the molecular weight distribution is 5.0 or less, variations of the properties of the polymer can be reduced. The molecular weight distribution is more preferably 3.5 or less, still more preferably 2.5 or less. The lower limit thereof is usually 1.0 or more.

The molecular weight distribution can be determined by dividing the weight average molecular weight by the number average molecular weight.

In particular, preferably, the weight average molecular weight and the molecular weight distribution of the polymer are 50000 or more and 2.5 or less, respectively. The properties of a cured product or composition of a polymer having a weight average molecular weight and molecular weight distribution within the above ranges can be easily controlled. Another aspect of the present invention relates to a vinyl ether group-containing (meth)acrylic acid ester polymer having a weight average molecular weight and molecular weight distribution within such predetermined ranges. In other words, the second polymer of the present invention is a vinyl ether group-containing (meth)acrylic acid ester polymer having a weight average molecular weight of 50000 or more and a molecular weight distribution of 2.5 or less.

The polymer may contain any amount of vinyl ether groups. The amount thereof can be appropriately controlled according to the purpose and use of the polymer. For example, it is 1 to 100 mol %, preferably 2 to 100 mol %. The amount of vinyl ether groups is a value obtainable from the ratios of the percentages of the reaction of the vinyl ether group-containing (meth)acrylic acid ester and other monomers or comparison of the integrals in $^1$H-NMR by gas chromatography, liquid chromatography, $^1$H-HMR, or the like.

When the polymer is produced by the production method of the present invention, the amount of gel components in the polymer can be reduced.

The amount of gel components in the vinyl ether group-containing (meth)acrylic acid ester polymer obtained by the production method of the present invention is preferably 10% by mass or less, more preferably 5% by mass or less, still more preferably 1% by mass or less, particularly preferably 0.5% by mass or less relative to 100% by mass the vinyl ether group-containing (meth)acrylic acid ester polymer.

The gel components preferably refer to components insoluble in ethyl acetate, toluene, or tetrahydrofuran. The solubility of the gel components at 25° C. in 100 g of ethyl acetate, toluene, or tetrahydrofuran is 0.5 g or lower, preferably 0.1 g or lower.

In a preferred embodiment of the present invention, the amount of a matter insoluble in ethyl acetate, toluene, or tetrahydrofuran relative to 100% by mass of the polymer is 10% by mass or less. The amount of the insoluble matter relative to 100% by mass of the polymer is more preferably 5% by mass or less, still more preferably 1% by mass or less, particularly preferably 0.5% by mass or less.

The amount of an insoluble matter can be determined as follows. Ethyl acetate, toluene, or tetrahydrofuran is added to the polymer so that the concentration of the polymer is about 33% by mass, and they are sufficiently stirred at room temperature and allowed to pass through a filter with a pore diameter of 4 An insoluble matter remaining on the filter is dried. When the mass of the dried substance is defined as (b) and the mass of the polymer at an initial stage is defined as (a), the amount of the insoluble matter can be determined from (b)/(a)×100. Specifically, the amount of the insoluble matter can be determined by the method described in the example below.

The polymer of the present invention preferably satisfies, in a differential molecular weight distribution curve obtained by measuring the polymer by gel permeation chromatography (GPC), a ratio of a triangle area (A) surrounded by lines T-$L_0$, $L_0$-$L_1$, and $L_1$-T to an area (B) surrounded by the differential molecular weight distribution curve and the line $L_0$-$L_1$ (A/B) of 0.8 to 2.0, wherein T is a point indicating the maximum value of the differential molecular weight distribution curve, and $L_0$ and $L_1$ are each a point at a height of 5% of the height of the point T on the differential molecular weight distribution curve, $L_0$ being on a lower-molecular-weight side of the distribution curve than $L_1$. The polymer satisfying a ratio within the above range is prevented from gelling. The ratio (A/B) is more preferably 0.8 to 1.5.

FIG. 1 shows a schematic view of a differential molecular weight distribution curve obtained by GPC with T, $L_0$, and $L_1$.

The measurement conditions of GPC are the same as those of the method described in the example below.

Another aspect of the present invention relates to a vinyl ether group-containing (meth)acrylic acid ester polymer having a ratio (A/B) within such a predetermined range. In other words, the third polymer of the present invention is a vinyl ether group-containing (meth)acrylic acid ester polymer satisfying, in a differential molecular weight distribution curve obtained by measuring the polymer by gel permeation chromatography (GPC), a ratio of a triangle area (A) surrounded by lines T-$L_0$, $L_0$-$L_1$, and $L_1$-T to an area (B) surrounded by the differential molecular weight distribution curve and the line $L_0$-$L_1$ (A/B) of 0.8 to 2.0, wherein T is a point indicating the maximum value of the differential molecular weight distribution curve, and $L_0$ and $L_1$ are each a point at a height of 5% of the height of the point T on the differential molecular weight distribution curve, $L_0$ being on a lower-molecular-weight side of the distribution curve than $L_1$.

The polymer of the present invention is preferably produced by the above-described production method. When the polymer of the present invention is produced by the above-described production method, in the polymerization, an intermediate of a vinyl ether group-containing (meth)acrylic acid ester polymer containing a structural unit represented by the following formula (5) and a first terminal group represented by the following formula (6), (7), or (8) and a second terminal group represented by the following formula (10) at respective main chain ends. Another aspect of the present invention relate to such an intermediate.

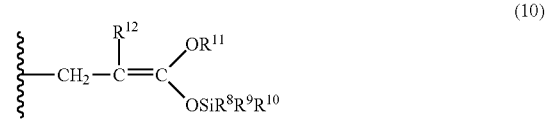

(10)

In the formula, $R^8$, $R^9$, and $R^{10}$ are the same as or different from each other and are each an organic group; $R^{11}$ is —(O—CHR$^2$CHR$^3$)$_n$—O—CH=CHR$^4$ where $R^2$ and $R^3$ are the same as or different from each other and are each a hydrogen atom or an organic group, $R^4$ is a hydrogen atom or an organic group, and n is an integer of 1 or more; and $R^{12}$ is a hydrogen atom or a methyl group.

$R^8$, $R^9$, and $R^{10}$ in the formula (10) are the same as $R^8$, $R^9$, and $R^{10}$ in the formula (2).

$R^{11}$ is —(O—$CHR^2CHR^3$)$_n$—O—CH=$CHR^4$ where $R^2$ and $R^3$ are the same as or different from each other and are each a hydrogen atom or an organic group, $R^4$ is a hydrogen atom or an organic group, and n is an integer of 1 or more. $R^2$, $R^3$, and $R^4$ are the same as $R^2$, $R^3$, and $R^4$ in the formula (1).

For example, when a polymer is produced by the above production method using a monomer component containing only a vinyl ether group-containing (meth)acrylic acid ester represented by the formula (1) and any of the silyl ketene acetals as a polymerization initiator, an intermediate represented by the following formula (11) is produced.

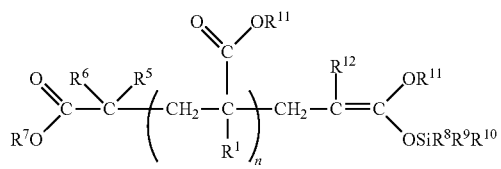

(11)

$R^1$, $R^5$, $R^6$, $R^7$, $R^8$, $R^9$, $R^{10}$, $R^{11}$, and $R^{12}$ in the formula (11) are the same as those described above.

The polymer of the present invention has properties such as radical curability, cation curability, and photocurability. When the polymer is radically or cationically polymerized from the vinyl ether group, a grafted polymer can be obtained, or when the vinyl ether group is reacted with an acid or electrophile, a variety of functional groups can be introduced to the polymer. The polymer of the present invention is suitable for pressure sensitive adhesives, adhesives, ink compositions for printing, compositions for resist, coatings, and molding materials, for example.

<3. Polymer Composition>

The production method of the present invention can provide a polymer composition containing a vinyl ether group-containing (meth)acrylic acid ester polymer. The production method of the present invention can achieve a very high conversion rate of a monomer component to be polymerized and a very low residual monomer content. Thus, the production method of the present invention provides a polymer composition containing a vinyl ether group-containing (meth)acrylic acid ester polymer and having a low residual monomer content. Such a polymer composition is a preferred embodiment of the present invention. In other words, the present invention also relates to a polymer composition containing the vinyl ether group-containing (meth)acrylic acid ester polymer, and an amount of a residual monomer is 10% by mass or less relative to 100% by mass of the polymer in the polymer composition.

The residual monomer content of the polymer composition relative to 100% by mass of the polymer in the polymer composition is preferably 10% by mass or less, more preferably 5% by mass or less, still more preferably 0 to 3% by mass.

The residual monomer content can be determined by $^1$H-NMR, gas chromatography, liquid chromatography, or gel permeation chromatography.

The polymer composition containing a polymer obtained by the above-described production method may be used as it is as the polymer composition of the present invention.

The polymer composition containing a vinyl ether group-containing (meth)acrylic acid ester polymer obtained by the above-described production method may be purified, for example, so that the residual monomer content may be appropriately controlled.

The vinyl ether group-containing (meth)acrylic acid ester polymer in the polymer composition of the present invention is the same as the vinyl ether group-containing (meth)acrylic acid ester polymer described in "2. Polymer".

The polymer composition may contain any amount of the vinyl ether group-containing (meth)acrylic acid ester polymer. The amount thereof may be appropriately designed according to the purpose and use of the polymer composition. For example, the amount is 1 to 99% by mass, preferably 2 to 98% by mass, more preferably 3 to 97% by mass relative to 100% by mass of the whole amount of the solids.

Herein, the "whole amount of the solids" means the whole amount of the components forming a cured product (excluding components such as solvents that volatilize during formation of the cured product).

The polymer composition may further contain a different component other than the vinyl ether group-containing (meth)acrylic acid ester polymer as needed.

Examples of the different component include solvents, polymerization initiators, chain transfer agents, dispersants, antioxidants, leveling agents, inorganic fine particles, coupling agents, curing agents, curing aids, plasticizers, polymerization inhibitors, ultraviolet absorbers, defoamers, antistatic agents, acid generators, resins, and polymerizable compounds. Any one or two or more of these components may be contained. The different component may be selected from known of these according to the purpose and use of the polymer composition. The amount of the different component to be used may be appropriately designed.

The polymer composition containing a vinyl ether group-containing (meth)acrylic acid ester polymer has properties such as radical curability, cation curability, and photocurability. Therefore, the polymer composition of the present invention is suitable for pressure sensitive adhesives, adhesives, ink compositions for printing, compositions for resist, coatings, and molding materials, for example.

EXAMPLES

The present invention is described based on examples in more detail below. They are, however, by no means limitative of the scope of the invention. Unless otherwise mentioned, the term "part(s)" means "part(s) by mass" and "%" means "% by mass". The polymers and the like in the examples were analyzed in the following way.

<$^1$H-NMR Analysis>

Apparatus: nuclear magnetic resonance apparatus (600 mHz) available from Agilent Technologies Japan, Ltd.

Solvent for measurement: deuterated chloroform

Preparation of sample: a few milligrams to tens of milligrams of a prepared polymer composition was dissolved in a solvent for measurement.

<Measurement of Molecular Weight>

A prepared polymer composition was dissolved in and diluted with tetrahydrofuran, and the dilution was passed through a filter having a pore diameter of 0.45 µm. The filtrate was subjected to measurement with the following gel permeation chromatography (GPC) apparatus under the following conditions.

Apparatus: HLC-8020GPC (Tosoh Corporation)
Eluting solvent: tetrahydrofuran
Reference material: standard polystyrene (Tosoh Corporation)
Separation column: TSKgel SuperHM-M, TSKgel SuperH-RC (Tosoh Corporation)

<Measurement of Percentage of Residual Monomers>

About 0.1 g of a prepared polymer composition and about 0.02 g of anisole as a reference material were diluted with 5 mL of ethyl acetate to prepare a solution. The solution was analyzed using the following gas chromatograph analyzer under the following conditions. The ratio between a peak area of the sample and a peak area of the reference material was calculated to determine the amount of residual monomers.

Apparatus: GC-2010 (Shimadzu Corporation)
Column: capillary column InertCap Pure-WAX (GL Sciences Inc., column length: 30 m, column inner diameter: 0.25 mm, thickness of film in capillary: 0.25 μm)
Carrier gas: nitrogen
Column temperature: the temperature was held at 40° C. for three minutes, increased at a rate of 8° C./min, and held at 220° C. for five minutes
Inlet temperature: 300° C.
Detector temperature: 300° C. (FID)
Substances to be detected and hold time: anisole (10.9 minutes), VEEA (19.7 minutes)

Example 1

A 50-mL Schlenk flask was charged with 2-(vinyloxyethoxy)ethyl methacrylate (hereinafter, referred to as "VEEM") (4.0 g, 20 mmol), dehydrated toluene (8 mL), and methyl (trimethylsilyl)dimethylketene acetal (40 μL, 0.2 mmol). While stirring under a stream of nitrogen at room temperature, 1-tert-butyl-4,4,4-tris(dimethylamino)-2,2-bis[tris(dimethylamino)phosphoranylideneamino]-2$\lambda^5$, 4$\lambda^5$-catena-di(phosphazene) (hereinafter, referred to as "phosphazene base P4-t-Bu") (0.8 M toluene solution, 125 μL, 0.1 mmol) was added thereto. The contents were stirred at room temperature for 24 hours, and then a small amount of methanol was added thereto. The reaction solution was concentrated to give a VEEM polymer-containing polymer composition. The solvent had a water content of 84 ppm at the start of the polymerization.

Figure 2:
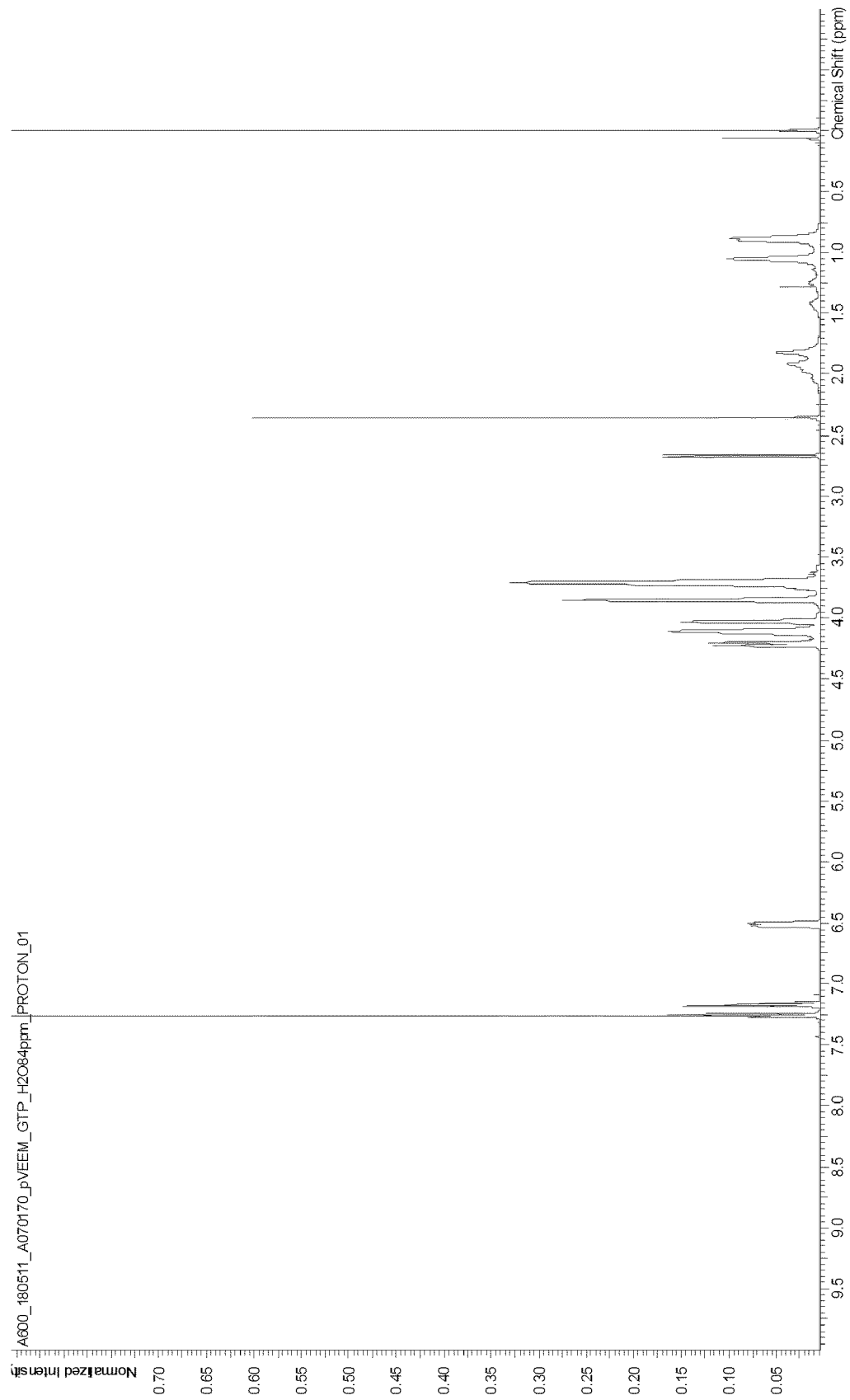
FIG. 2 is a $^1$H-NMR spectrum of a polymer of Example 1.

The polymer composition was analyzed by $^1$H-NMR. Peaks derived from vinyl ether appeared around 6.5 ppm, and the integral showed that the vinyl ether groups all remained in the polymer composition (FIG. 2). This demonstrated that only the methacryloyl groups of VEEM were polymerized to give a polymer. No peaks of the VEEM monomer (peaks around 6.5 ppm, 6.1 ppm, and 5.6 ppm) were found.

The polymer had a weight average molecular weight (Mw) of 112555, a number average molecular weight (Mn) of 38224, and a molecular weight distribution (Mw/Mn) of 2.94.

Example 2

A 50-mL Schlenk flask was charged with VEEM (4.0 g, 20 mmol), dehydrated toluene (8 mL), and methyl (trimethylsilyl)dimethylketene acetal (40 μL, 0.2 mmol). While stirring under a stream of nitrogen at room temperature, a phosphazene base P4-t-Bu (0.8 M toluene solution, 125 μL, 0.1 mmol) was added thereto. The contents were stirred at room temperature for 24 hours, and then a small amount of methanol was added thereto. The reaction solution was concentrated to give a VEEM polymer-containing polymer composition. The solvent had a water content of 164 ppm at the start of the polymerization.

Figure 3:
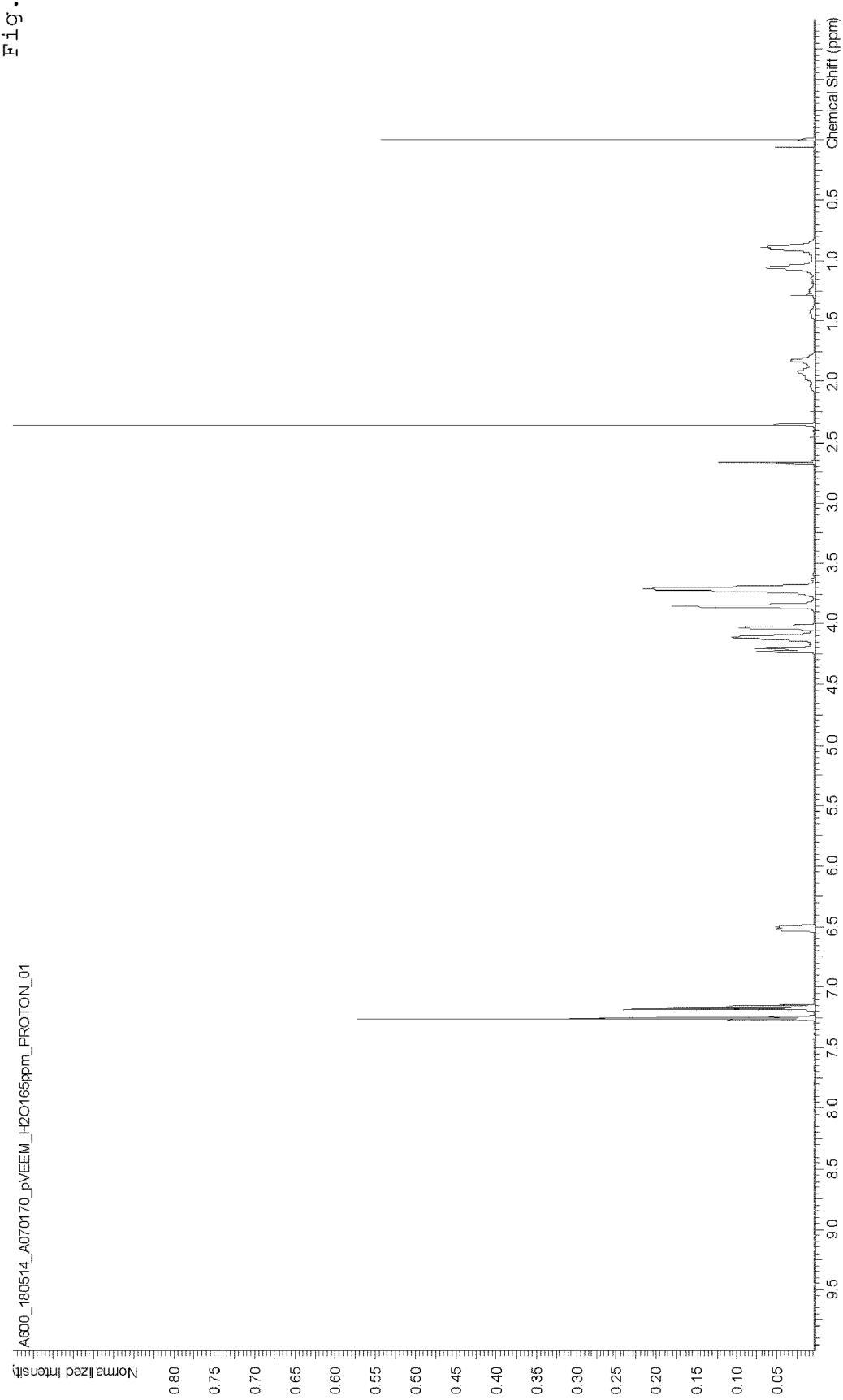
FIG. 3 is a $^1$H-NMR spectrum of a polymer of Example 2.

The polymer composition was analyzed by $^1$H-NMR. Peaks derived from vinyl ether appeared around 6.5 ppm, and the integral showed that the vinyl ether groups all remained in the polymer composition (FIG. 3). This demonstrated that only the methacryloyl groups of VEEM were polymerized to give a polymer. No peaks of the VEEM monomer were found.

The polymer had a weight average molecular weight of 103748, a number average molecular weight of 30344, and a molecular weight distribution (Mw/Mn) of 3.42.

Example 3

A 50-mL Schlenk flask was charged with VEEM (2.0 g, 10 mmol), methyl methacrylate (hereinafter, referred to as "MMA") (1.0 g, 10 mmol), dehydrated tetrahydrofuran (8 mL), and methyl (trimethylsilyl)dimethylketene acetal (41 μL, 0.2 mmol). While stirring under a stream of nitrogen at room temperature, phosphazene base P4-t-Bu (0.8 M toluene solution, 63 μL) was added thereto. The contents were stirred at room temperature overnight (about 20 hours), and then a small amount of methanol was added thereto. The reaction solution was concentrated to give a VEEM-MMA copolymer-containing polymer composition.

Figure 4:
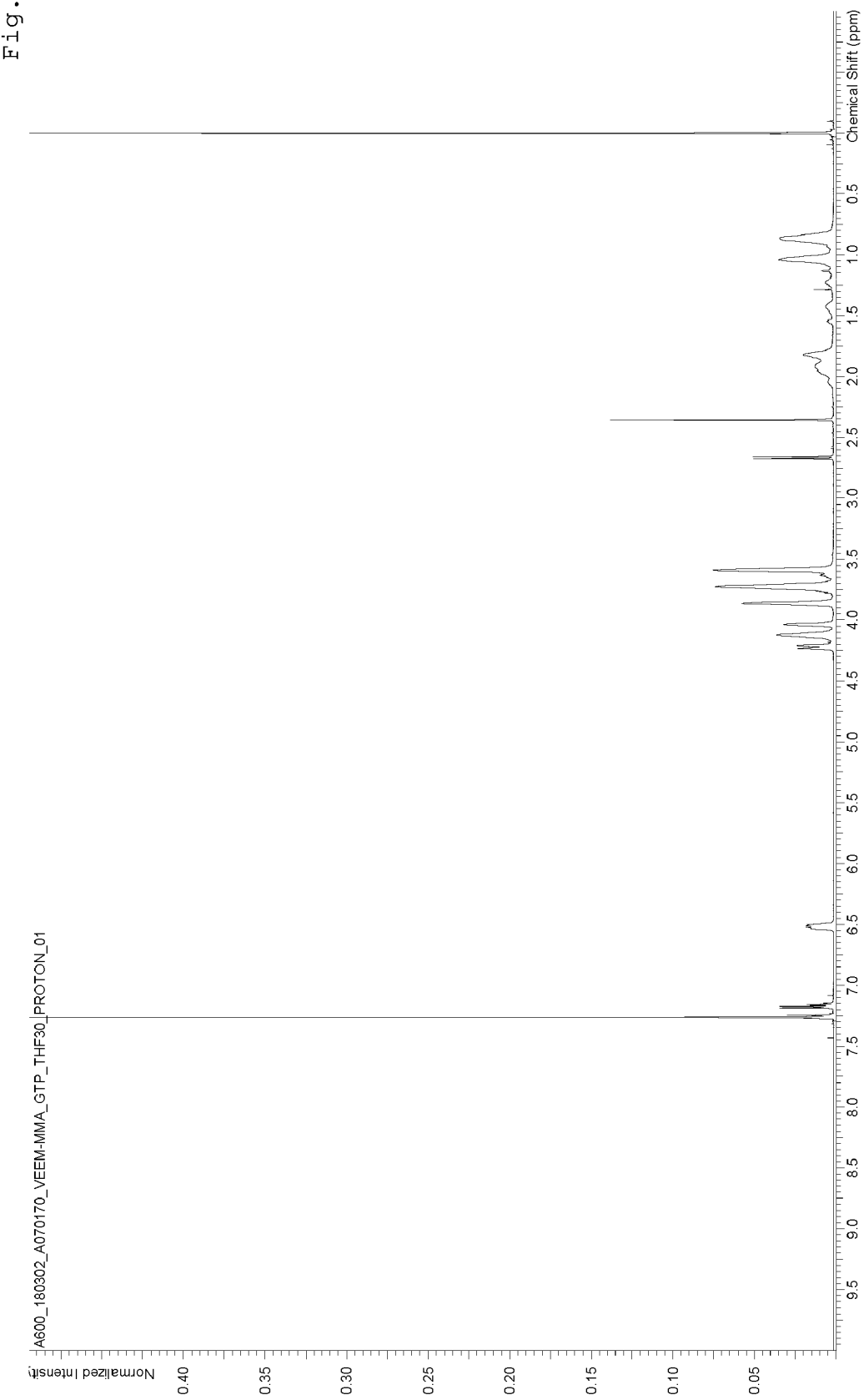
FIG. 4 is a $^1$H-NMR spectrum of a polymer of Example 3.

The polymer composition was analyzed by $^1$H-NMR. Peaks derived from vinyl ether appeared around 6.5 ppm, and the integral showed that the vinyl ether groups all remained in the polymer composition (FIG. 4). This demonstrated that only the methacryloyl groups of VEEM were polymerized to give a polymer. No peaks of the VEEM monomer were found.

The polymer had a weight average molecular weight of 27671, a number average molecular weight of 10589, and a molecular weight distribution (Mw/Mn) of 2.61.

Example 4

A 50-mL Schlenk flask was charged with 2-(vinyloxyethoxy)ethyl acrylate (hereinafter, referred to as "VEEA") (3.7 g, 20 mmol), dehydrated toluene (8 mL), and methyl (trimethylsilyl)dimethylketene acetal (41 μL, 0.2 mmol). While stirring under a stream of nitrogen and at 30° C., phosphazene base P4-t-Bu (0.8 M toluene solution, 100 μL, 0.08 mmol) was added thereto. The contents were stirred at 30° C. overnight (about 24 hours), and then a small amount of methanol was added thereto. The reaction solution was concentrated to give a VEEA polymer-containing polymer composition.

Figure 5:
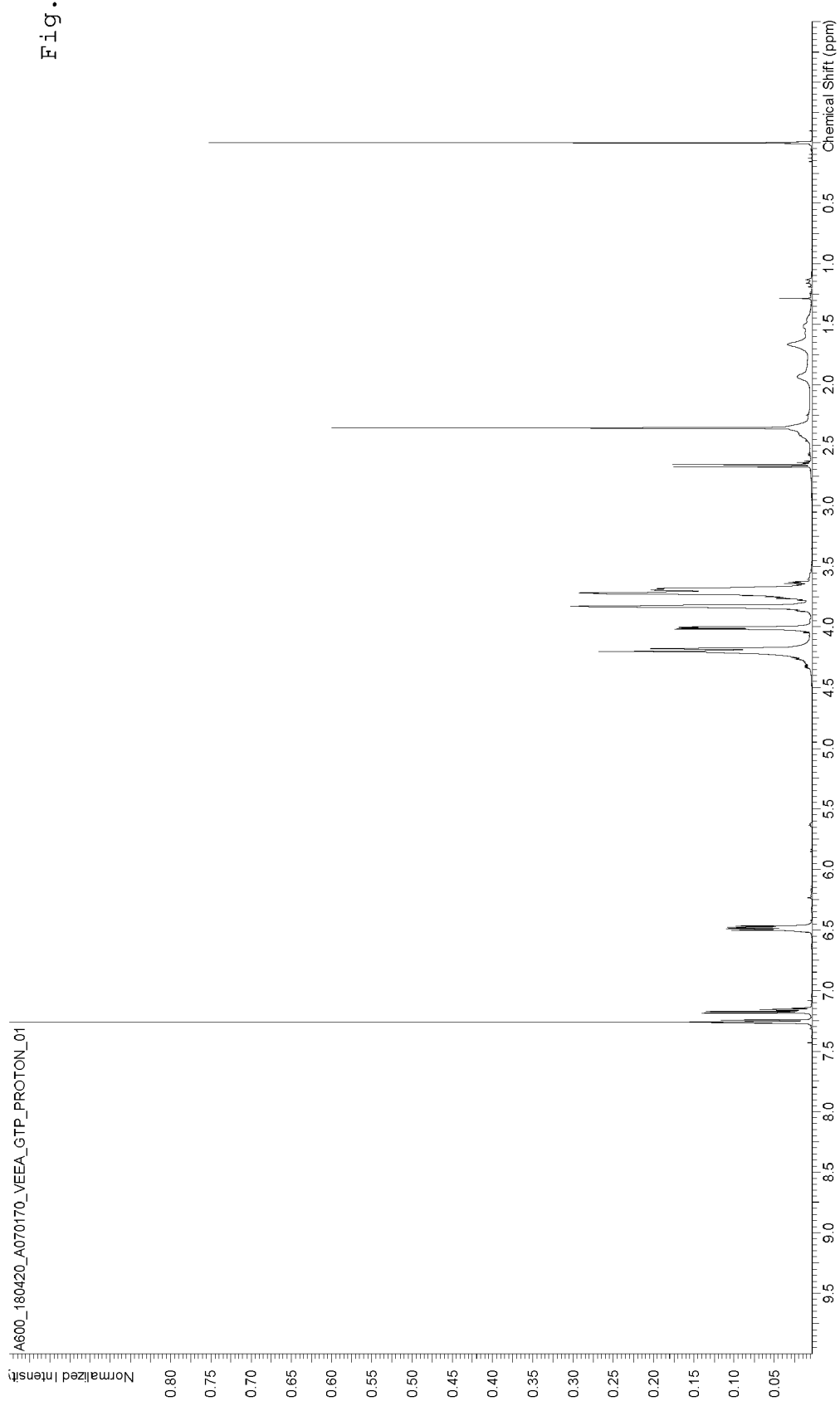
FIG. 5 is a $^1$H-NMR spectrum of a polymer of Example 4.

The polymer composition was analyzed by $^1$H-NMR. Peaks derived from vinyl ether appeared around 6.5 ppm, and the integral showed that the vinyl ether groups all remained in the polymer composition (FIG. 5). This demonstrated that only the acryloyl groups of VEEA were polymerized to give a polymer. No peaks of the VEEA monomer (peaks around 6.5 ppm, 6.2 ppm, and 5.8 ppm) were found. The polymer had a weight average molecular weight of 19404, a number average molecular weight of 7553, and a molecular weight distribution (Mw/Mn) of 2.57.

Example 5

A 50-mL Schlenk flask was charged with VEEA (0.37 g, 2.0 mmol), MMA (1.80 g, 18 mmol), dehydrated toluene (8 mL), and methyl (trimethylsilyl)dimethylketene acetal (40 μL, 0.20 mmol). While stirring under a stream of nitrogen at room temperature, phosphazene base P4-t-Bu (0.8 M toluene solution, 100 μL, 0.08 mmol) was added thereto. The contents were stirred at room temperature for five hours, and then a small amount of methanol was added thereto. The reaction solution was concentrated to give a VEEA-MMA copolymer-containing polymer composition. The solvent had a water content of 19 ppm at the start of the polymerization.

The copolymer composition was analyzed by $^1$H-NMR. Peaks derived from vinyl ether appeared (around 6.5 ppm), and the integral showed that the vinyl ether groups all remained in the polymer composition. No peaks of the VEEA monomer were found.

The polymer had a weight average molecular weight of 19300, a number average molecular weight of 6600, and a molecular weight distribution (Mw/Mn) of 2.92.

Example 6

A 50-mL Schlenk flask was charged with dehydrated toluene (8 mL), methyl (trimethylsilyl)dimethylketene acetal (40 μL, 0.20 mmol), and phosphazene base P4-t-Bu (0.8 M toluene solution, 25 μL, 0.02 mmol). While stirring under a stream of nitrogen at room temperature, a monomer mixture (VEEA (0.37 g, 2.0 mmol) and n-butyl acrylate (hereinafter, referred to as "BA") (2.3 g, 18 mmol)) were added dropwise slowly. The contents were stirred at room temperature for five hours, and then a small amount of methanol was added thereto. The reaction solution was concentrated to give a VEEA-BA copolymer-containing polymer composition.

The polymer composition was analyzed by $^1$H-NMR. Peaks derived from vinyl ether appeared, and the integral showed that the vinyl ether groups all remained in the polymer composition. Further, the percentage of residual monomers was measured. As a result, the percentage of residual VEEA was about 4%.

The polymer had a weight average molecular weight of 15700, a number average molecular weight of 6900, and a molecular weight distribution (Mw/Mn) of 2.28.

Example 7

A 50-mL Schlenk flask was charged with VEEA (0.30 g, 1.6 mmol), BA (1.2 g, 9.2 mmol), 2-ethylhexyl acrylate (hereinafter, referred to as "EHA") (1.7 g, 9.2 mmol), dehydrated toluene (8 mL), and methyl (trimethylsilyl) dimethylketene acetal (40 μL, 0.20 mmol). While stirring under a stream of nitrogen at 0° C., phosphazene base P4-t-Bu (8.0 mM toluene solution, 2.5 mL, 0.02 mmol) was added thereto. The contents were stirred at room temperature for five hours, and then the reaction solution was diluted with ethyl acetate. The dilution was passed through a silica gel short column to remove the catalyst. The resulting solution was concentrated to give a VEEA-BA-EHA copolymer-containing polymer composition.

The polymer composition was analyzed by $^1$H-NMR. Peaks derived from vinyl ether appeared, and the integral showed that the vinyl ether groups all remained in the polymer composition. No peaks of the VEEA monomer were found. The polymer had a weight average molecular weight of 41300, a number average molecular weight of 15200, and a molecular weight distribution (Mw/Mn) of 2.72.

Example 8

A 50-mL Schlenk flask was charged with dehydrated toluene (8 mL), methyl (trimethylsilyl)dimethylketene acetal (40 μL, 0.20 mmol), and phosphazene base P4-t-Bu (0.8 M toluene solution, 25 μL, 0.02 mmol). While stirring under a stream of nitrogen at room temperature, a monomer mixture (VEEM (0.4 g, 2.0 mmol) and MMA (1.8 g, 18 mmol)) were added dropwise slowly. The contents were stirred at room temperature for five hours, and then a small amount of methanol was added thereto. The reaction solution was concentrated to give a VEEM-MMA copolymer-containing polymer composition.

The polymer composition was analyzed by $^1$H-NMR. Peaks derived from vinyl ether appeared, and the integral showed that the vinyl ether groups all remained in the polymer composition. No peaks of the VEEM monomer were found. The polymer had a weight average molecular weight of 26200, a number average molecular weight of 12200, and a molecular weight distribution (Mw/Mn) of 2.15.

Example 9

A 50-mL Schlenk flask was charged with VEEM (0.43 g, 2.1 mmol), 2-ethylhexyl methacrylate (hereinafter, referred to as "EHMA") (3.60 g, 18.1 mmol), dehydrated toluene (8 mL), and methyl (trimethylsilyl)dimethylketene acetal (40 μL, 0.20 mmol). While stirring under a stream of nitrogen at room temperature, phosphazene base P4-t-Bu (0.8 M toluene solution, 25 μL, 0.02 mmol) was added thereto. The contents were stirred at room temperature overnight, and then the reaction solution was diluted with ethyl acetate. The dilution was passed through a silica gel short column to remove the catalyst. The resulting solution was concentrated to give a VEEM-EHMA copolymer-containing polymer composition.

The polymer composition was analyzed by $^1$H-NMR. Peaks derived from vinyl ether appeared, and the integral showed that the vinyl ether groups all remained in the polymer composition. No peaks of the VEEM monomer were found. The polymer had a weight average molecular weight of 34800, a number average molecular weight of 20100, and a molecular weight distribution (Mw/Mn) of 1.73.

Example 10

A 50-mL Schlenk flask was charged with VEEM (0.43 g, 2.1 mmol), EHMA (3.57 g, 18.0 mmol), dehydrated toluene (8 mL), and methyl (trimethylsilyl)dimethylketene acetal (40 μL, 0.20 mmol). While stirring under a stream of nitrogen at room temperature, phosphazene base P4-t-Bu (0.08 M toluene solution, 75 μL, 6 μmol) was added thereto. The contents were stirred at room temperature overnight, and then the reaction solution was diluted with ethyl acetate. The dilution was passed through a silica gel short column to remove the catalyst.

The polymer composition was analyzed by $^1$H-NMR. Peaks derived from vinyl ether appeared, and the integral showed that the vinyl ether groups all remained in the polymer composition. No peaks of the VEEM monomer were found. The polymer had a weight average molecular weight of 38600, a number average molecular weight of 24300, and a molecular weight distribution (Mw/Mn) of 1.59.

Example 11

A 50-mL Schlenk flask was charged with VEEA (3.7 g, 20 mmol), dehydrated toluene (8 mL), and methyl (triisopropylsilyl)dimethylketene acetal (60 μL, 0.20 mmol). While stirring under a stream of nitrogen and at 0° C., phosphazene base P4-t-Bu (8.0 mM toluene solution, 2.5 mL, 0.02 mmol) was added thereto. The contents were stirred at room temperature for five hours, and then the reaction solution was diluted with ethyl acetate. The dilution was passed through a silica gel short column to remove the catalyst. The resulting solution was concentrated to give a VEEA polymer-containing polymer composition.

The polymer composition was analyzed by $^1$H-NMR. Peaks derived from vinyl ether appeared, and the integral showed that the vinyl ether groups all remained in the polymer composition. Further, the percentage of residual monomers was measured. As a result, the percentage of residual VEEA was about 2%. The polymer had a weight average molecular weight of 47400, a number average molecular weight of 10100, and a molecular weight distribution (Mw/Mn) of 4.69.

Example 12

A 50-mL Schlenk flask was charged with dehydrated tetrahydrofuran (8 mL), methyl (trimethylsilyl)dimethylketene acetal (40 μL, 0.20 mmol), tetrabutylammonium bis(benzoate) (synthesized with reference to Macromolecules, 1990, 23, 4034-4041) (0.05 M tetrahydrofuran solution, 40 μL, 2.0 μmol). While stirring under a stream of nitrogen at room temperature, VEEM (4.0 g, 20 mmol) was added dropwise slowly. The contents were stirred at room temperature for five hours, and then the reaction solution was diluted with ethyl acetate. The dilution was passed through a silica gel short column to remove the catalyst. The resulting solution was concentrated to give a VEEM polymer-containing polymer composition.

The polymer composition was analyzed by $^1$H-NMR. Peaks derived from vinyl ether appeared, and the integral showed that the vinyl ether groups all remained in the polymer composition. No peaks of the VEEM monomer were found.

The polymer had a weight average molecular weight of 36900, a number average molecular weight of 25400, and a molecular weight distribution (Mw/Mn) of 1.45.

Example 13

A 50-mL Schlenk flask was charged with dehydrated tetrahydrofuran (8 mL), methyl (trimethylsilyl)dimethylketene acetal (40 μL, 0.20 mmol), and tetrabutylammonium benzoate (Sigma-Aldrich, 0.05 M tetrahydrofuran solution, 40 μL, 2.0 μmol). While stirring under a stream of nitrogen at room temperature, VEEM (4.0 g, 20 mmol) was added dropwise slowly. The contents were stirred at room temperature for five hours, and then the reaction solution was diluted with ethyl acetate. The dilution was passed through a silica gel short column to remove the catalyst. The resulting solution was concentrated to give a VEEM polymer-containing polymer composition.

The polymer composition was analyzed by $^1$H-NMR. Peaks derived from vinyl ether appeared, and the integral showed that the vinyl ether groups all remained in the polymer composition. No peaks of the VEEM monomer were found. The polymer had a weight average molecular weight of 25700, a number average molecular weight of 18000, and a molecular weight distribution (Mw/Mn) of 1.42.

Example 14

A 50-mL Schlenk flask was charged with dehydrated tetrahydrofuran (8 mL), methyl (trimethylsilyl)dimethylketene acetal (40 μL, 0.20 mmol), and tetrabutylammonium fluoride (0.1 M tetrahydrofuran solution, 20 μL, 2.0 μmol, prepared by dissolving tetrabutylammonium fluoride trihydrate (Tokyo Chemical Industry Co., Ltd.) in tetrahydrofuran). While stirring under a stream of nitrogen at room temperature, VEEM (4.0 g, 20 mmol) was added dropwise slowly. The contents were stirred at room temperature for five hours, and then the reaction solution was diluted with ethyl acetate. The dilution was passed through a silica gel short column to remove the catalyst. The resulting solution was concentrated to give a VEEM polymer-containing polymer composition. The polymer composition was analyzed by $^1$H-NMR. Peaks derived from vinyl ether appeared, and the integral showed that the vinyl ether groups all remained in the polymer composition. No peaks of the VEEM monomer were found. The polymer had a weight average molecular weight of 59800, a number average molecular weight of 21400, and a molecular weight distribution (Mw/Mn) of 2.80.

Example 15

A 50-mL Schlenk flask was charged with toluene (8 mL), methyl (trimethylsilyl)dimethylketene acetal (40 μL, 0.20 mmol), and phosphazene base P4-t-Bu (0.8 M toluene solution, 25 μL, 0.02 mmol). While stirring under a stream of nitrogen at room temperature, a monomer mixture (VEEM (3.6 g, 18 mmol) and N,N-dimethylacrylamide (0.11 g, 2.0 mmol)) was added dropwise slowly. The contents were stirred at room temperature for three hours, and then the reaction solution was diluted with ethyl acetate. The dilution was passed through a silica gel short column to remove the catalyst. The resulting solution was concentrated to give a VEEM-(N,N-dimethylacrylamide) copolymer-containing polymer composition.

The polymer composition was analyzed by $^1$H-NMR. Peaks derived from vinyl ether appeared, and the integral showed that the vinyl ether groups all remained in the polymer composition. No peaks of the VEEM monomer were found. The polymer had a weight average molecular weight of 35500, a number average molecular weight of 19800, and a molecular weight distribution (Mw/Mn) of 1.79.

Example 16

A 50-mL Schlenk flask was charged with dehydrated tetrahydrofuran (8 mL), methyl (trimethylsilyl)dimethylketene acetal (40 μL, 0.20 mmol), and 2,8,9-triisopropyl-2,5,8,9-tetraaza-1-phosphabicyclo[3,3,3]undecane (Sigma-Aldrich, 1.0 M toluene solution, 20 μL, 2.0 μmol). While stirring under a stream of nitrogen at room temperature, VEEM (4.0 g, 20 mmol) was added dropwise slowly. The contents were stirred at room temperature for five hours, and then the reaction solution was diluted with ethyl acetate. The dilution was passed through a silica gel short column to remove the catalyst. The resulting solution was concentrated to give a polymer composition.

The polymer composition was analyzed by $^1$H-NMR. Peaks derived from vinyl ether appeared, and the integral showed that the vinyl ether groups all remained in the polymer composition. No peaks of the VEEM monomer were found.

The polymer had a weight average molecular weight of 50400, a number average molecular weight of 35500, and a molecular weight distribution (Mw/Mn) of 1.42.

Comparative Example 1

A 50-mL Schlenk flask was charged with 1,1-diphenylethylene (102 mg, 0.56 mmol) and THF (19 mL), and cooled to −78° C. The solvent at this time had a water content of 16 ppm. Then, sec-BuLi (sec-butyllithium, 1.04 M, 300 μl, 0.3 mmol) was added dropwise slowly thereto. The contents were stirred at the same temperature for 15 minutes, and then VEEM (1.88 g, 9.39 mmol, water content of 12.5 ppm) was added slowly. The contents were stirred for 12 hours while the temperature was maintained at −78° C. A small amount of methanol was added to stop the reaction. The reaction solution was concentrated to give a VEEM polymer-containing polymer composition.

Figure 6:
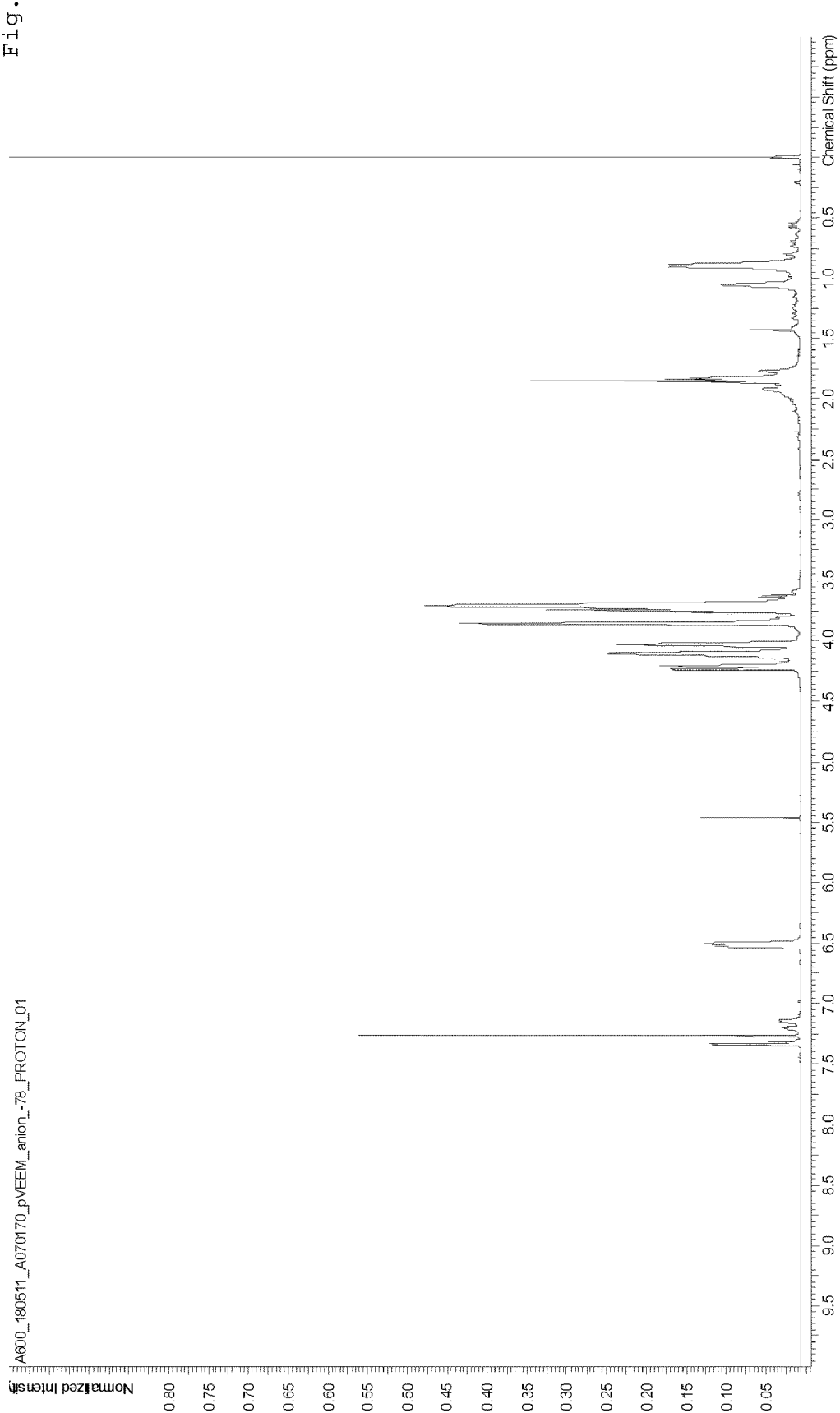
FIG. 6 is a $^1$H-NMR spectrum of a polymer of Comparative Example 1.

The polymer composition was analyzed by $^1$H-NMR. Peaks derived from vinyl ether appeared around 6.5 ppm, and the integral showed that the vinyl ether groups all remained in the polymer composition (FIG. 6). This demonstrated that only the methacryloyl groups of VEEM were polymerized to give a polymer. No peaks of the VEEM monomer were found.

The polymer had a weight average molecular weight of 6978, a number average molecular weight of 5584, and a molecular weight distribution (Mw/Mn) of 1.25.

Comparative Example 2

A 50-mL Schlenk flask was charged with 1,1-diphenylethylene (102 mg, 0.56 mmol) and THF (19 mL), and cooled to −78° C. The solvent at this time had a water content of 16 ppm. Then, sec-BuLi (1.04 M, 300 μl, 0.3 mmol) was added dropwise slowly thereto. The contents were stirred at the same temperature for 15 minutes, and then the reaction solution was warmed to room temperature. VEEM (1.88 g, 9.39 mmol, water content of 12.5 ppm) was added slowly thereto, the contents were stirred for 12 hours, and a small amount of methanol was added to stop the reaction. The reaction solution was concentrated to give a VEEM polymer-containing polymer composition.

Figure 7:
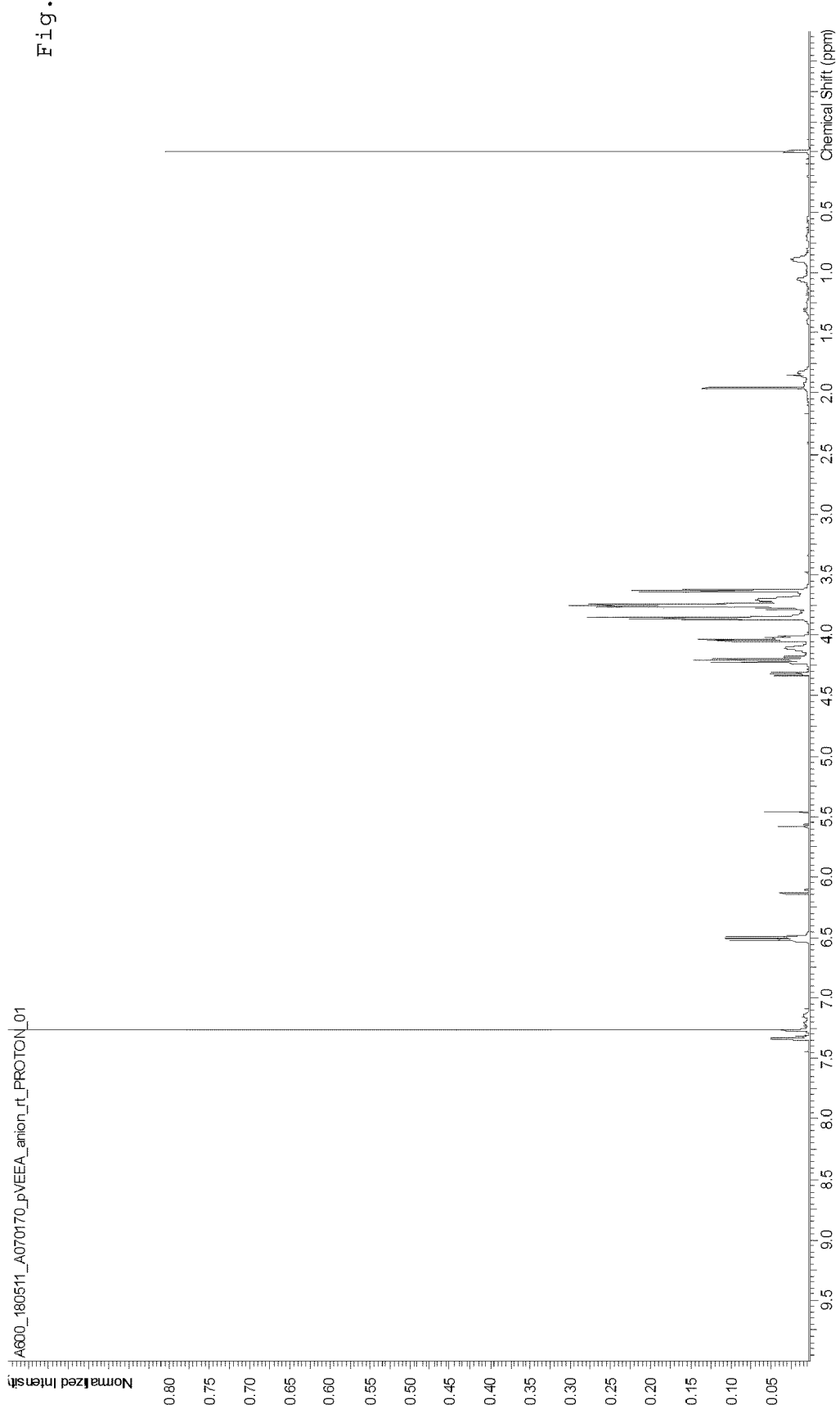
FIG. 7 is a $^1$H-NMR spectrum of a polymer of Comparative Example 2.

The polymer composition was analyzed by $^1$H-NMR. Peaks derived from vinyl ether appeared around 6.5 ppm, and also, peaks of the monomers appeared (FIG. 7). This demonstrated that only the methacryloyl groups of VEEM were polymerized to give a polymer when anionic polymerization was performed at room temperature, but the polymerization was not complete.

Comparative Example 3

A flask equipped with a stirrer, a reflux tube, a temperature sensor, and a nitrogen inlet was charged with VEEA (8 parts by mass), MMA (24 parts by mass), methyl ethyl ketone (128 parts by mass) as a solvent, n-dodecyl mercaptan (0.16 parts by mass) as a chain transfer agent, and V-65 (Fujifilm Wako Pure Chemical Corporation) (0.04 parts by mass) as a polymerization initiator. The flask was purged with nitrogen. Then, the contents were heated to 80° C., and under stirring in a nitrogen atmosphere, a 6% by mass V-65 solution in methyl ethyl ketone (31 parts by mass) and a solution mixture of MMA (8 parts by mass) and n-dodecyl mercaptan (0.04 parts by mass) were each added dropwise over five hours. Thereafter, the contents were stirred at the same temperature for one hour to give a polymer solution. The polymer solution was subjected to reprecipitation using hexane to give a VEEA-MMA copolymer-containing polymer composition. The polymer had a weight average molecular weight of 204830, a number average molecular weight of 16237, and a molecular weight distribution (Mw/Mn) of 12.6.

The percentages of the insoluble matters (% by mass) in the polymer compositions of Examples 7, 11, and 14 were determined in the following way. Specifically, to about 2 to 3 g of the polymer composition was added ethyl acetate so that the solid content was about 33% by mass. The contents were sufficiently stirred at room temperature, and the resulting solution was passed through a filter having a pore size of 4 μm. The substance remaining on the filter was washed with about 7 to 10 g of ethyl acetate, and was dried at room temperature for five minutes. The mass (b) of the dried substance was determined. The percentage of the insoluble matter was calculated from the following formula, where (a) indicates the mass of the polymer composition. The results are shown in Table 1.

Percentage of insoluble matter (% by mass) = $(b)/(a) \times 100$

TABLE 1

| | Polymer solution | | | Washing | Amount of insoluble matter | Percentage of |
|---|---|---|---|---|---|---|
| Example | Polymer composition (g) | Ethyl acetate (g) | % by mass | (Ethyl acetate) (g) | after filtration (mg) | insoluble matter (% by mass) |
| 7 | 2.50 | 5.00 | 33.3 | 7.77 | 0.1 | 0.00% |
| 11 | 3.09 | 6.12 | 33.6 | 9.25 | 0.1 | 0.00% |
| 14 | 3.10 | 6.20 | 33.3 | 9.37 | 0.1 | 0.02% |

Table 1 demonstrated that the amounts of the insoluble matters in the polymer compositions of the examples were very small.

The polymer compositions of Examples 1 to 16 and Comparative Example 3 were subjected to measurement of the molecular weight to obtain differential molecular weight distribution curves. In the curves, as shown in FIG. 1, the ratio of a triangle area (A) surrounded by lines T-$L_0$, $L_0$-$L_1$, and $L_1$-T to an area (B) surrounded by a differential molecular weight distribution curve and the line $L_0$-$L_1$ (A/B) was determined. Here, T is a point indicating the maximum value of the differential molecular weight distribution curve, $L_0$ and $L_1$ are each a point at a height of 5% of the height of the point T on the differential molecular weight distribution curve, and $L_0$ is on a lower-molecular-weight side of the distribution curve than $L_1$. The results are shown in Table 2.

TABLE 2

|  | A/B |
|---|---|
| Example 1 | 1.12 |
| Example 2 | 1.05 |
| Example 3 | 1.11 |
| Example 4 | 1.04 |
| Example 5 | 1.14 |
| Example 6 | 1.11 |
| Example 7 | 1.08 |
| Example 8 | 1.59 |
| Example 9 | 1.02 |
| Example 10 | 1.04 |
| Example 11 | 1.04 |
| Example 12 | 1.18 |
| Example 13 | 1.15 |
| Example 14 | 1.21 |
| Example 15 | 1.05 |
| Example 16 | 1.16 |
| Comparative Example 3 | 0.77 |

As shown in Table 2, the polymer compositions of the examples had a A/B of 1.02 to 1.59, and no gelation occurred. On the other hand, the polymer composition of the comparative example had a A/B of 0.77, and gelation occurred. This demonstrated that gelation of the polymer compositions having a A/B of 0.8 to 2.0 did not occur.

REFERENCE SIGNS LIST 1 differential molecular weight distribution curve

The invention claimed is:

1. A method of producing a vinyl ether group-containing (meth)acrylic acid ester polymer, the method comprising:
group-transfer polymerizing a monomer component containing a vinyl ether group-containing (meth)acrylic acid ester represented by the following formula (1), in the presence of a carbon-carbon double bond-containing silane compound and a catalyst,

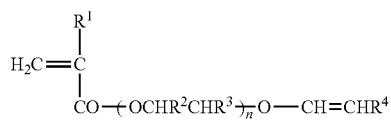

(1)

wherein
$R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more.

2. The method of producing a vinyl ether group-containing (meth)acrylic acid ester polymer according to claim 1, wherein the catalyst is at least one selected from the group consisting of an organic phosphorus compound, a N-heterocyclic carbene, a fluorine ion-containing compound, a cyclic amine compound, and an ammonium salt compound.

3. The method of producing a vinyl ether group-containing (meth)acrylic acid ester polymer according to claim 1, wherein a solvent is present for the group-transfer polymerization, and the solvent has an oxygen concentration of 1000 ppm or lower at the start of the polymerization.

4. The method of producing a vinyl ether group-containing (meth)acrylic acid ester polymer according to claim 1, wherein a solvent is present for the group-transfer polymerization, and the solvent has a water content of 1000 ppm or lower at the start of the polymerization.

5. A vinyl ether group-containing (meth)acrylic acid ester polymer comprising:
a structural unit represented by the following formula (5); and
a terminal group derived from a carbon-carbon double bond-containing silane compound at a main chain end,

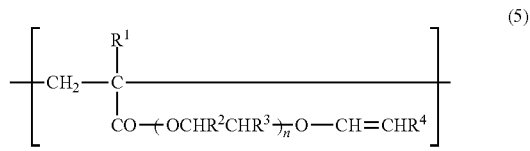

(5)

wherein
$R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more.

6. The vinyl ether group-containing (meth)acrylic acid ester polymer according to claim 5, further comprising a terminal structure represented by the following formula (9):

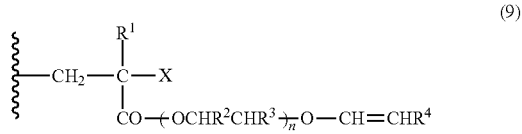

(9)

wherein
$R^1$ is a hydrogen atom or a methyl group; $R^2$ and $R^3$ are the same as or different from each other and are each a hydrogen atom or an organic group; $R^4$ is a hydrogen atom or an organic group; X is a hydrogen atom, a halogen atom, an alkyl group, a hydroxymethyl group, an allyl group, or a propargyl group; and n is an integer of 1 or more.

7. The vinyl ether group-containing (meth)acrylic acid ester polymer according to claim 5,
wherein the polymer has a number average molecular weight of 1000 to 1000000.

8. The vinyl ether group-containing (meth)acrylic acid ester polymer according to claim 5,
wherein an amount of a matter insoluble in ethyl acetate, toluene, or tetrahydrofuran relative to 100% by mass of the polymer is 10% by mass or less.

9. The vinyl ether group-containing (meth)acrylic acid ester polymer according to claim 5,
wherein the polymer is obtained by a method comprising:
group-transfer polymerizing a monomer component containing a vinyl ether group-containing (meth)acrylic acid ester represented by the following formula (1), in the presence of a carbon-carbon double bond-containing silane compound and a catalyst, (1)

wherein
$R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more the method of producing a vinyl ether group-containing (meth)acrylic acid ester polymer.

10. An intermediate of a vinyl ether group-containing (meth)acrylic acid ester polymer, comprising:
a structural unit represented by the following formula (5); and
a first terminal group represented by the following formula (6), (7), or (8) and a second terminal group represented by the following formula (10) at respective main chain ends:

(5)

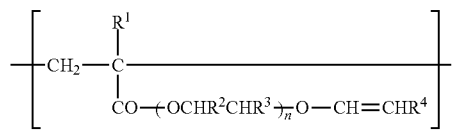

(6)

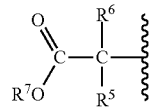

(7)

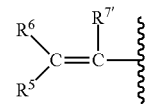

(8)

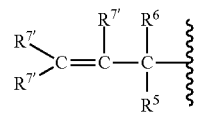

(10)

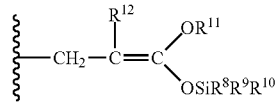

wherein
in the formula (5), $R^1$ is a hydrogen atom or a methyl group; $R^2$ and $R^3$ are the same as or different from each other and are each a hydrogen atom or an organic group; $R^4$ is a hydrogen atom or an organic group; and n is an integer of 1 or more;
in the formula (6), $R^5$ and $R^6$ are the same as or different from each other and are each a hydrogen atom or an organic group; and $R^7$ is an organic group;
in the formulas (7) and (8), $R^5$, $R^6$, and $R^{7'}$ are the same as or different from each other and are each a hydrogen atom or an organic group; and
in the formula (10), $R^8$, $R^9$, and $R^{10}$ are the same as or different from each other and are each an organic group; $R^{11}$ is —(O—$CHR^2CHR^3$)$_n$—O—CH=$CHR^4$ where $R^2$ and $R^3$ are the same as or different from each other and are each a hydrogen atom or an organic group, $R^4$ is a hydrogen atom or an organic group, and n is an integer of 1 or more; and $R^{12}$ is a hydrogen atom or a methyl group.

11. A polymer composition comprising the vinyl ether group-containing (meth)acrylic acid ester polymer according to claim 5,
wherein an amount of a residual monomer is 10% by mass or less relative to 100% by mass of the polymer in the polymer composition.

* * * * *